(12) United States Patent
Yates

(10) Patent No.: US 12,340,389 B2
(45) Date of Patent: Jun. 24, 2025

(54) SYSTEM AND METHOD FOR INCENTIVIZING REPEAT TRANSACTIONS WITH MERCHANTS WITHIN A PRESCRIBED GEOGRAPHIC AREA USING PAYMENT PROCESSING NETWORK DATA AND PROVIDING FOR TIME DISTRIBUTED PAYMENTS

(71) Applicant: Rodney Yates, Gretna, NE (US)

(72) Inventor: Rodney Yates, Gretna, NE (US)

( * ) Notice: Subject to any disclaimer, the term of this patent is extended or adjusted under 35 U.S.C. 154(b) by 0 days.

(21) Appl. No.: 17/943,698

(22) Filed: Sep. 13, 2022

(65) Prior Publication Data

US 2023/0092175 A1 Mar. 23, 2023

Related U.S. Application Data

(60) Provisional application No. 63/244,123, filed on Sep. 14, 2021.

(51) Int. Cl.
*G06Q 30/00* (2023.01)
*G06Q 20/24* (2012.01)
(Continued)

(52) U.S. Cl.
CPC ......... *G06Q 30/0236* (2013.01); *G06Q 20/24* (2013.01); *G06Q 20/351* (2013.01); *G06Q 20/401* (2013.01)

(58) Field of Classification Search
None
See application file for complete search history.

(56) References Cited

U.S. PATENT DOCUMENTS 6,009,411 A 12/1999 Kepecs
6,298,330 B1 10/2001 Gardenswartz et al.
(Continued)

FOREIGN PATENT DOCUMENTS

AU 2010303939 A1 5/2012

OTHER PUBLICATIONS

International Search Report and Written Opinion for Application No. PCT/US2022/043254, dated Dec. 8, 2022.
(Continued)

*Primary Examiner* — Maria V Vanderhorst
(74) *Attorney, Agent, or Firm* — Ryan T. Grace; Advent, LLP

(57) ABSTRACT

A method for incentivizing repeat transactions within a prescribed geographic area using payment process network data includes acquiring a first set of transaction data from a payment network, creating a database of a second set of transaction data of transactions by an enrolled cardholder or merchant, identifying rewards eligible transactions and creating a database of rewards eligible transactions by enrolled cardholders at enrolled merchants, calculating rewards by querying the database of rewards eligible transactions and multiplying the amount by a factor, transmitting an instruction to a virtual card issuer to apply the rewards amount to a virtual payment card, receiving an authorization request to make a purchase using rewards, and determining if the transaction of the authorization request occurred within a prescribed geographic area in which rewards may be spent at enrolled merchants and if so authorization for the virtual card issuer to complete the transaction using the rewards.

16 Claims, 14 Drawing Sheets

(51) Int. Cl.
  *G06Q 20/34* (2012.01)
  *G06Q 20/40* (2012.01)
  *G06Q 30/0207* (2023.01)

(56) References Cited

U.S. PATENT DOCUMENTS

| | | |
|---|---|---|
| 6,594,640 B1 | 7/2003 | Postrel |
| 7,010,497 B1 | 3/2006 | Nyhan et al. |
| 7,455,226 B1 | 11/2008 | Hammond et al. |
| 7,647,278 B1 | 1/2010 | Foth et al. |
| 7,890,367 B2 | 2/2011 | Senghore et al. |
| 8,036,929 B1 | 10/2011 | Reisman |
| 8,170,907 B2 | 5/2012 | Puri et al. |
| 8,285,588 B2 | 10/2012 | Postrel |
| 8,301,557 B1 | 10/2012 | Crowe et al. |
| 8,355,946 B2 | 1/2013 | Hammond et al. |
| 8,387,858 B2 | 3/2013 | Bohn et al. |
| 8,407,087 B2 | 3/2013 | Postrel |
| 8,504,411 B1 | 8/2013 | Subasic et al. |
| 8,612,290 B2 | 12/2013 | Postrel |
| 8,621,068 B2 | 12/2013 | Zohar et al. |
| 8,688,525 B2 | 4/2014 | Minde |
| 8,965,784 B2 | 2/2015 | Postrel |
| 9,024,719 B1 | 5/2015 | Saunders |
| 9,213,983 B2 | 12/2015 | Martin, Jr. et al. |
| 9,412,102 B2 | 8/2016 | Wolf et al. |
| 9,430,773 B2 | 8/2016 | Aloni et al. |
| 9,489,680 B2 | 11/2016 | Baker et al. |
| 9,613,361 B2 | 4/2017 | Wolf et al. |
| 9,836,759 B2 | 12/2017 | Georgi |
| 9,990,645 B1 | 6/2018 | Emigh et al. |
| 10,430,774 B2 | 10/2019 | Salmon et al. |
| 10,521,813 B2 | 12/2019 | Okerlund |
| 10,885,541 B1 | 1/2021 | Ho |
| 10,956,927 B2 | 3/2021 | Rhee et al. |
| 2001/0020242 A1 | 9/2001 | Gupta et al. |
| 2001/0054003 A1 | 12/2001 | Chien et al. |
| 2002/0026348 A1 | 2/2002 | Fowler et al. |
| 2002/0062253 A1 | 5/2002 | Dosh et al. |
| 2004/0143518 A1 | 7/2004 | Siegel |
| 2004/0172260 A1 | 9/2004 | Junger et al. |
| 2005/0071228 A1 | 3/2005 | Bortolin et al. |
| 2005/0075931 A1 | 4/2005 | Pearson |
| 2005/0134449 A1 | 6/2005 | Barile et al. |
| 2005/0159996 A1 | 7/2005 | Lazarus et al. |
| 2005/0160023 A1 | 7/2005 | Pearson |
| 2005/0234753 A1 | 10/2005 | Pinto et al. |
| 2005/0273388 A1 | 12/2005 | Roetter |
| 2005/0289003 A1 | 12/2005 | Thompson et al. |
| 2006/0004633 A1 | 1/2006 | Ashbaugh |
| 2006/0064372 A1 | 3/2006 | Gupta |
| 2006/0129426 A1 | 6/2006 | Pearson |
| 2006/0155641 A1 | 7/2006 | Postrel |
| 2006/0195359 A1 | 8/2006 | Robinson et al. |
| 2006/0235747 A1 | 10/2006 | Hammond et al. |
| 2006/0259364 A1 | 11/2006 | Strock et al. |
| 2006/0293957 A1 | 12/2006 | Petersen et al. |
| 2007/0016462 A1 | 1/2007 | Atkinson et al. |
| 2007/0033104 A1 | 2/2007 | Collins et al. |
| 2007/0094114 A1 | 4/2007 | Bufford et al. |
| 2007/0156515 A1 | 7/2007 | Hasselback et al. |
| 2007/0156533 A1 | 7/2007 | Hammond et al. |
| 2007/0157237 A1 | 7/2007 | Cordray et al. |
| 2007/0198937 A1 | 8/2007 | Paris |
| 2007/0210152 A1 | 9/2007 | Read |
| 2007/0244741 A1 | 10/2007 | Blume et al. |
| 2007/0260523 A1 | 11/2007 | Schadt et al. |
| 2008/0033857 A1 | 2/2008 | Moses |
| 2008/0052140 A1 | 2/2008 | Neal et al. |
| 2008/0092162 A1 | 4/2008 | Lundy et al. |
| 2008/0097846 A1 | 4/2008 | Oikawa et al. |
| 2008/0103968 A1 | 5/2008 | Bies et al. |
| 2008/0126515 A1 | 5/2008 | Chambers et al. |
| 2008/0133351 A1 | 6/2008 | White et al. |
| 2008/0195609 A1 | 8/2008 | Paris |
| 2009/0063351 A1 | 3/2009 | Schmeyer et al. |
| 2009/0065572 A1 | 3/2009 | Jain |
| 2009/0076870 A1 | 3/2009 | Hammond et al. |
| 2009/0094048 A1 | 4/2009 | Wallace et al. |
| 2009/0106112 A1 | 4/2009 | Dalmia et al. |
| 2009/0125719 A1 | 5/2009 | Cochran et al. |
| 2009/0222358 A1* | 9/2009 | Bednarek ........... G06Q 30/0601 705/26.1 |
| 2009/0247193 A1 | 10/2009 | Kalavade |
| 2009/0287562 A1 | 11/2009 | Bosch et al. |
| 2010/0057553 A1 | 3/2010 | Ameiss et al. |
| 2011/0119190 A1 | 5/2011 | Mina |
| 2011/0161172 A1 | 6/2011 | Lee |
| 2011/0167440 A1 | 7/2011 | Greenfield |
| 2011/0178842 A1 | 7/2011 | Rane et al. |
| 2011/0178855 A1 | 7/2011 | Rane et al. |
| 2011/0225033 A1 | 9/2011 | Schmeyer et al. |
| 2011/0231246 A1 | 9/2011 | Bhatia et al. |
| 2011/0246219 A1 | 10/2011 | Smith et al. |
| 2011/0246287 A1 | 10/2011 | Wright et al. |
| 2011/0295689 A1 | 12/2011 | Brady |
| 2011/0307509 A1 | 12/2011 | Hsiao et al. |
| 2012/0036013 A1 | 2/2012 | Neuhaus et al. |
| 2012/0036178 A1 | 2/2012 | Gavini et al. |
| 2012/0130536 A1 | 5/2012 | Canter et al. |
| 2012/0150740 A1 | 6/2012 | Isaacson et al. |
| 2012/0196675 A1 | 8/2012 | Ferdinand et al. |
| 2012/0253663 A1 | 10/2012 | Hani et al. |
| 2012/0265625 A1* | 10/2012 | Pletz ..................... G06Q 20/24 705/16 |
| 2012/0271705 A1 | 10/2012 | Postrel |
| 2013/0006766 A1 | 1/2013 | Dedeoglu et al. |
| 2013/0013396 A1 | 1/2013 | Vinson et al. |
| 2013/0080259 A1 | 3/2013 | Durvasula et al. |
| 2013/0132182 A1 | 5/2013 | Fung et al. |
| 2013/0325579 A1 | 12/2013 | Salmon et al. |
| 2014/0006129 A1 | 1/2014 | Heath |
| 2014/0012653 A1 | 1/2014 | Cohagan et al. |
| 2014/0074690 A1 | 3/2014 | Grossman et al. |
| 2014/0095281 A1 | 4/2014 | Weiss et al. |
| 2014/0108521 A1 | 4/2014 | Marquess et al. |
| 2014/0207592 A1 | 7/2014 | Kavis et al. |
| 2014/0316873 A1 | 10/2014 | Sines |
| 2014/0337205 A1 | 11/2014 | Tavares |
| 2015/0019317 A1 | 1/2015 | Mitchell |
| 2015/0112790 A1 | 4/2015 | Wolinsky et al. |
| 2015/0112826 A1 | 4/2015 | Crutchfield, Jr. |
| 2015/0154588 A1* | 6/2015 | Purves ................. G06Q 20/12 705/14.27 |
| 2015/0220957 A1 | 8/2015 | Chauhan |
| 2015/0348083 A1 | 12/2015 | Brill et al. |
| 2016/0078466 A1* | 3/2016 | Markowitz ........ G06Q 30/0233 705/14.33 |
| 2016/0132876 A1 | 5/2016 | Petersen et al. |
| 2016/0189191 A1 | 6/2016 | Spalding et al. |
| 2016/0224997 A1 | 8/2016 | Blackhurst et al. |
| 2016/0350789 A1 | 12/2016 | Joglekar et al. |
| 2017/0161714 A1 | 6/2017 | Feng et al. |
| 2017/0178174 A1 | 6/2017 | Mitchell |
| 2017/0278124 A1* | 9/2017 | Purves ............... G06Q 30/0229 |
| 2017/0278125 A1 | 9/2017 | Tietzen et al. |
| 2018/0082322 A1* | 3/2018 | Sharma .................. G06F 16/27 |
| 2018/0084308 A1 | 3/2018 | Lopatecki et al. |
| 2018/0197195 A1 | 7/2018 | Das et al. |
| 2018/0276710 A1 | 9/2018 | Tietzen et al. |
| 2018/0308105 A1 | 10/2018 | Fordyce, III et al. |
| 2019/0114666 A1 | 4/2019 | Kohli |
| 2019/0147708 A1 | 5/2019 | Monaco et al. |
| 2019/0205915 A1 | 7/2019 | Hunter et al. |
| 2019/0279244 A1 | 9/2019 | Postrel |
| 2020/0202315 A1 | 6/2020 | Mohandas et al. |
| 2021/0073849 A1 | 3/2021 | Qi et al. |
| 2021/0166260 A1 | 6/2021 | Ho et al. |
| 2021/0217043 A1 | 7/2021 | Sharma et al. |

(56) References Cited

U.S. PATENT DOCUMENTS

2021/0398163 A1    12/2021    Nelsen
2022/0114570 A1    4/2022    Sawant et al.

OTHER PUBLICATIONS

Baris Karaman, Customer Lifetime Value Prediction, 2019 (Year: 2019).
Ching, Andrew, et al. "Payment Card Rewards Programs and Consumer Payment Choice." Journal of Banking and Finance 34 (2010), pp. 1773-1787. (Year: 2010).
Deloitte center, Making blockchain real, 2016 (Year: 2016).
"Elements of Successful Loyalty Model in Merchant Payments" (Published on Oct. 2019 in CGAP—at https://www.cgap.org/research/publication/elements-successful-loyalty-model-merchant-payments) (Year: 2019).
Hsieh, Nan-Chen. "An Integrated Data Mining and Behavioral Scoring Model for Analyzing Bank Customers." Expert Systems with Applications 27 (2004) pp. 623-633. (Year: 2004).
International Search Report for corresponding application No. PCT/US2021/052045 mailed Dec. 23, 2021.
Smart Card Alliance. "The Mobile Payments and N FC Landscape: A U.S. Perspective." Sep. 2011. (Year: 2011).

\* cited by examiner

SYSTEM AND METHOD FOR INCENTIVIZING REPEAT TRANSACTIONS WITH MERCHANTS WITHIN A PRESCRIBED GEOGRAPHIC AREA USING PAYMENT PROCESSING NETWORK DATA AND PROVIDING FOR TIME DISTRIBUTED PAYMENTS

CROSS-REFERENCE TO RELATED APPLICATIONS

This application claims the benefit of U.S. Provisional Application No. 63/244,123, filed Sep. 14, 2021, the entirety of which is hereby incorporated by reference herein.

STATEMENT REGARDING FEDERALLY SPONSORED RESEARCH

Not Applicable.

BACKGROUND

The presently disclosed systems and methods relate to incentivizing repeat transactions with merchants within a prescribed geographic area using payment processing network data and using acquired transaction data to determine customer lifetime value for various cohorts.

Historically, "charge" cards or other payment cards have been used for customer transactions with merchants. The payments to merchants are initially made by the customer's bank which issued the payment card and thereby credit is provided to the customer. Over time, associations of banks and payment card issuers have grown resulting in payment networks including transaction processing companies and banks that enable cardholders to widely use charge cards or other payment cards at many merchants and regardless of the merchant's relationship or lack of relationship with the bank issuing the payment card to the customer.

Separately, merchants have an ongoing need to incentivize repeat transactions by customers. In order to incentivize repeat transactions, merchants have historically provided incentives such as coupons and rewards programs which allow customers to earn points or cash to apply towards further purchases with the same merchant. These rewards programs only allow for points/rewards to be generated through purchases from the singular merchant and are allowed to be applied to a purchase at any of the merchant's locations-regardless of geography and including the merchant's e-commerce website.

Card issuers have also implemented rewards systems separately from merchants. Typically, rewards are generated through all purchases (e.g., a "cashback" program) or purchases at all locations of specific merchants—regardless of geography. The rewards are generally in the form of cash that can be applied to the cardholder's account balance and thus are generally applicable to any purchase.

Shopping centers, malls, outlet malls, and other groupings of different merchants do not have a way of providing rewards generated from purchases at merchants within the group. Typically, shopping centers, malls, outlet malls, and other merchant groupings only act preemptively to drive sales, e.g., through the use of promotional coupons. These types of promotions are not earned through merchant transactions and do not allow for rewards to be earned amongst a variety of merchants within the mall and spent at any of the merchants within the mall.

Separately but relatedly, shopping centers or like groups and individual merchants themselves typically do not have robust information about their customers. This is primarily due to a lack of information collection (e.g., due to inability). The paucity of information prevents shopping centers or like groups from analyzing their customers using techniques such as matching and/o recommendation algorithms.

Also separately but relatedly, payment service providers and individual merchants sometimes provide for services that allow customers to make purchases and pay in installments. These services are not provided in the context of a shopping center or other groups of merchants due to technological problems (e.g., the inability to handle payment authorization for a variety of merchants). Existing systems for delayed payment (e.g., buy now pay later services) do not provide for the flexibility of allowing customers/users to make purchases at any of a select group of merchants/stores (e.g., stores within a shopping center or other geographic location) and pay overtime. Rather, existing systems allow for purchases at only a single merchant regardless of location or a single merchant and single location (e.g., a single store). The purchase is pre-authorized for only that specific purchase at that specific merchant. Existing systems lack dynamic authorization request handling that would permit a customer/user to make buy now pay later style purchases at any merchant of a group of merchants (e.g., buy now pay later authorization for merchants of a shopping center or a subset of merchants within a shopping center).

Furthermore, existing rewards systems typically do not allow for the earning of rewards when purchases are made using a buy now pay later system or service. This is a result of the technical limitations of existing rewards systems which lack an ability to discriminate between purchases made using a customer's payment card and buy now pay later purchases made by customers. Existing rewards systems also lack the ability to discriminate between purchases made using earned rewards and buy now pay later purchases made by customers/users. The lack of this technical ability prevents rewards from being earned on buy now pay later purchases while excluding the earning of rewards when earned rewards are spend to make the purchase.

BRIEF SUMMARY

Briefly, systems and methods are disclosed herein which provide for incentivizing repeat transactions with merchants within a prescribed geographic area using payment processing network data. The disclosed systems and methods allow for groupings of merchants such as merchants within a shopping center to provide for a customer rewards system that allows earning of rewards at any of the merchants and spending of rewards at any of the merchant's physical locations within the shopping center. These systems and methods are more effective at incentivizing repeat transactions than promotional coupons and allow for rewards to be earned through purchases widely while limiting the spending of the rewards narrowly to the physical merchant locations within the shopping center (or other geographically defined area).

The system also collects transaction data from participating users in order to facilitate providing rewards and in turn incentivize repeat transactions. This transaction data is in turn used to analyze customers using, for example, matching and/or recommendation algorithms. This can include, for example, making product or brand recommendations for customers based on a matching/recommendation algorithm analysis, determining using a matching/recommendation algorithm, similarities between customers (e.g., to enable targeting of promotions, advertisements, or the like), determining potential voids in merchants or merchant categories within the geographic area using matching/recommendation algorithms and acquired customer data, and the like. Importantly, the incentivizing system provides for data acquisition that makes possible the calculation of such customer lifetime values. Without this high-quality data, the calculation of customer lifetime value (e.g., in the shopping center context) would be inaccurate or impossible. The data includes transaction data and includes other cardholder information such as demographics, brand interests, and behavior.

The system also provides for delayed payments by customers/users for purchases made within or at a merchant of a shopping center, group of merchants, merchant ecosystem, or the like. The shortcomings of existing buy now pay later systems limiting such services to individual merchants or purchases are driven by technical problems, and the system described herein solves those technical problems to address the shortcomings of existing systems and provide for customers/users ability to make a purchase at any merchant within a group of merchants (e.g., a shopping center) and pay for the purchase overtime. The system provides this technical solution in that the system generates two virtual payment cards held in a customer/user device virtual wallet. One virtual card balance is increased with earned rewards and can be presented to make purchases with rewards. The second virtual payment card provides the full funds needed to make a buy now pay later purchase and is presentable by the customer to make such a purchase. The second virtual card is linked to the customer/user's banking institution to provide for repayment of the spent funds overtime. Authorization for either virtual card is handled by the system to ensure that rewards are only spent at particular merchants (e.g., merchants within a single shopping center) and that buy now pay later purchases made with the second virtual payment card are only made at specific merchants (e.g., merchants within a shopping center and/or merchants for which the customer/user has previously applied for and been granted credit for a buy now pay later transaction) and fall within an authorized transaction amount.

The system also provides a technical solution to the technical shortcomings of existing systems which prevent rewards from being earned by customers/users when making a buy now pay later purchase. The system provides this technical solution in that the system collects transaction data associated with the second virtual payment card and determines if such transactions are eligible for the earning of rewards. Separating the rewards function from the buy now pay later credit function facilitates discrimination of transaction type by the system (e.g., based on virtual payment card number) such that rewards can be applied for qualifying transactions and excluded on transactions spending previously earned rewards. The system disclosed herein can use other technical techniques to make this and other determinations to differentiate between rewards functions and buy now pay later functions (e.g., using a single virtual card and using transaction flagging/sorting based on a determination using data, transaction or user device, that can identify a transaction as being rewards spend or buy now pay later spend).

DESCRIPTION OF THE DRAWINGS

In the accompanying drawings which form part of the specification.

In the figures, corresponding reference characters and symbols indicate corresponding parts throughout the several views of the drawings.

DETAILED DESCRIPTION

Figure 1:
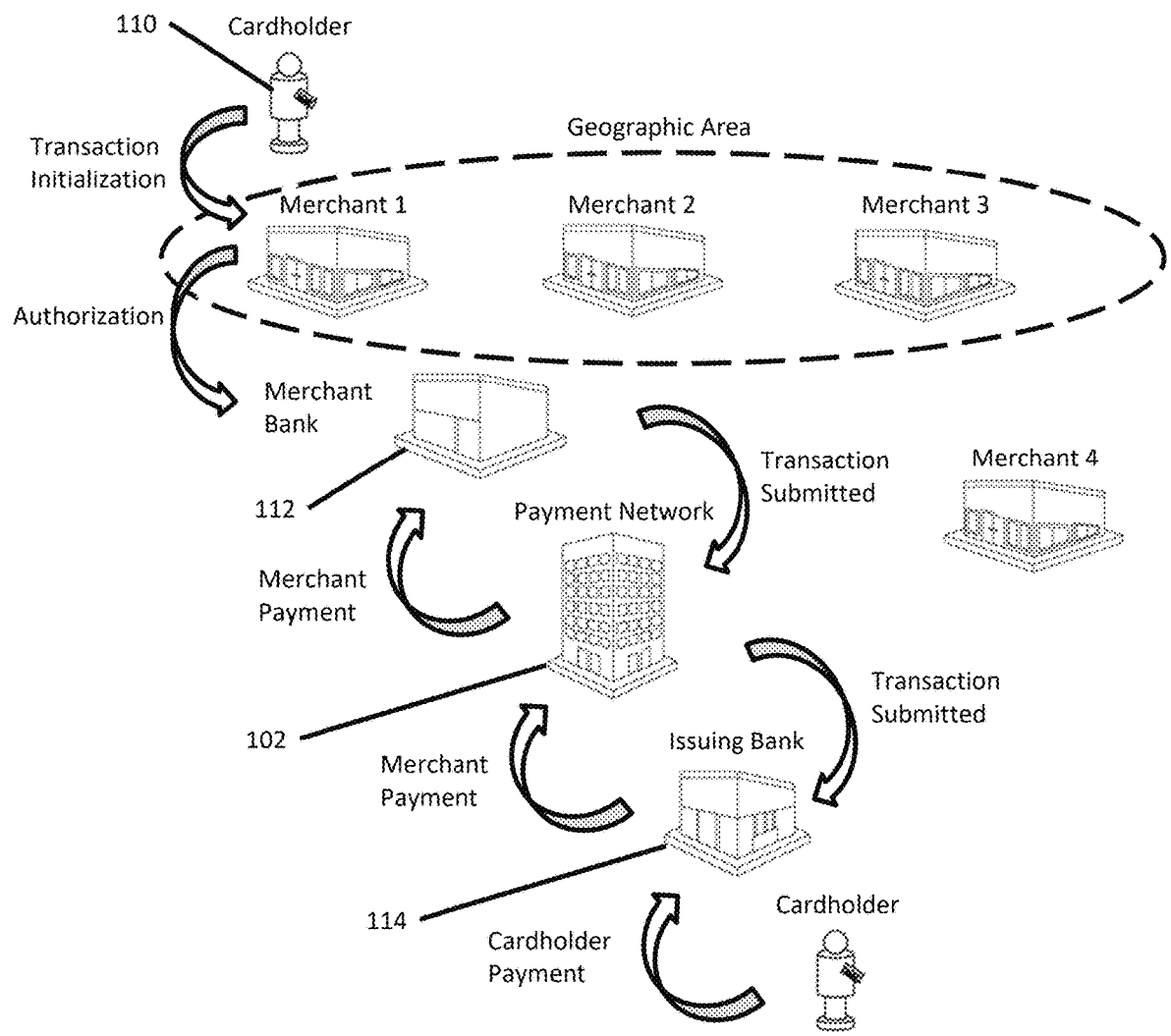
FIG. 1 is a schematic diagram illustrating an exemplary multi-party payment card system for enabling payment-by-card transactions and its relationship with different merchants in different locations.

The following detailed description illustrates systems and methods to incentivizing repeat transactions with merchants within a prescribed geographic area by way of example and not by way of limitation. The description also illustrates systems and methods to determine customer lifetime value for different cohorts related to the incentivizing system and methods described herein. The description enables one skilled in the art to make and use the incentive systems and methods, describes several embodiments, adaptations, variations, alternatives, and uses of the incentive system, including what is presently believed to be the best mode of making and using the system. Additionally, it is to be understood that the disclosed systems and methods are not limited to the details of construction and the arrangements of components set forth in the following description or illustrated in the drawings. The systems and methods disclosed are capable of other embodiments and of being practiced or being carried out in various ways. Also, it is to be understood that the phraseology and terminology used herein is for the purpose of description and should not be regarded as limiting.

Figure 10A:
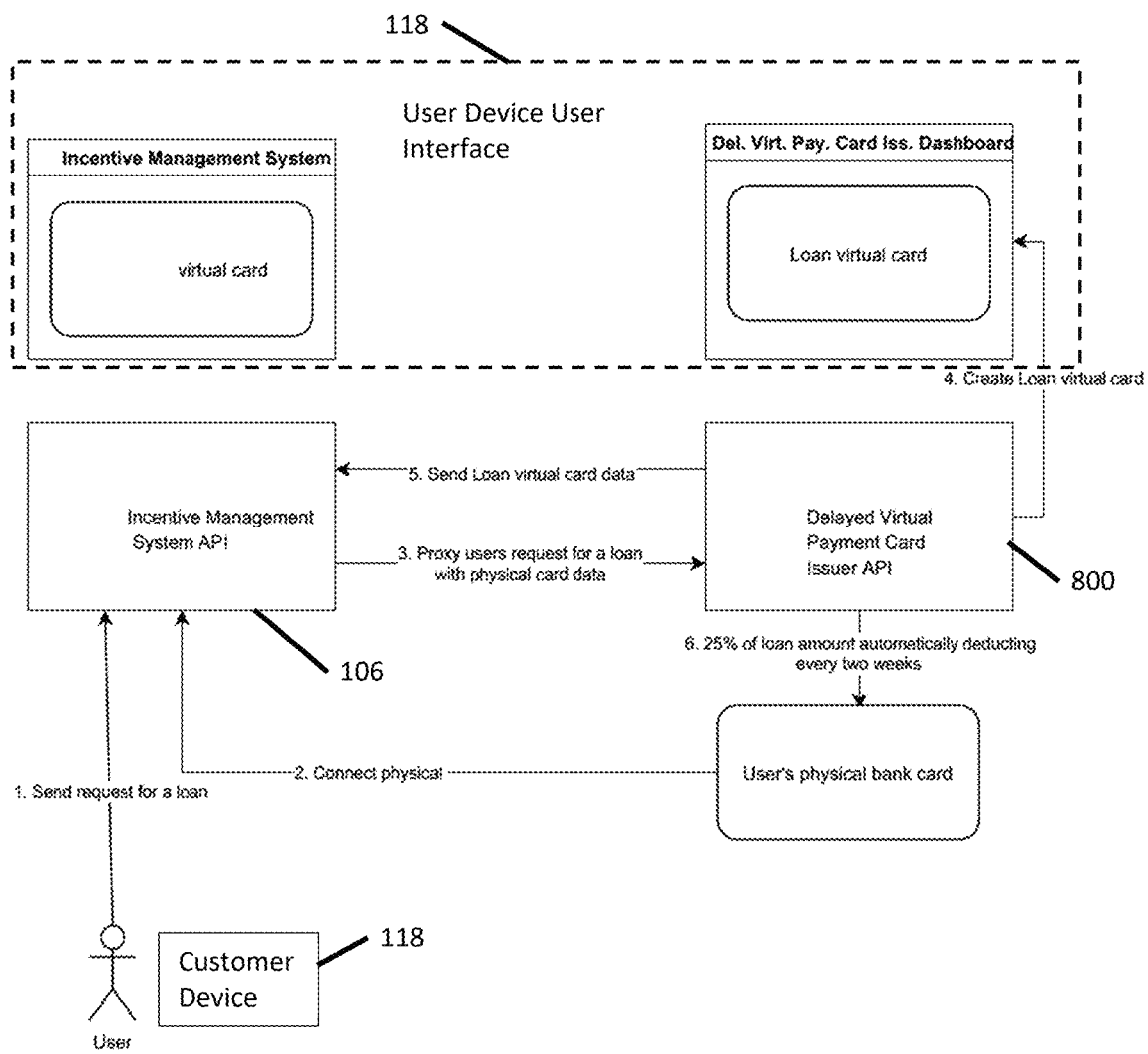
FIG. 10A is a simplified block diagram showing the relationship between the incentive management system and the delayed virtual payment card issuer and the creation of a virtual payment card for delayed payments where the virtual payment card is created by the delayed virtual payment card issuer.
Figure 10B:
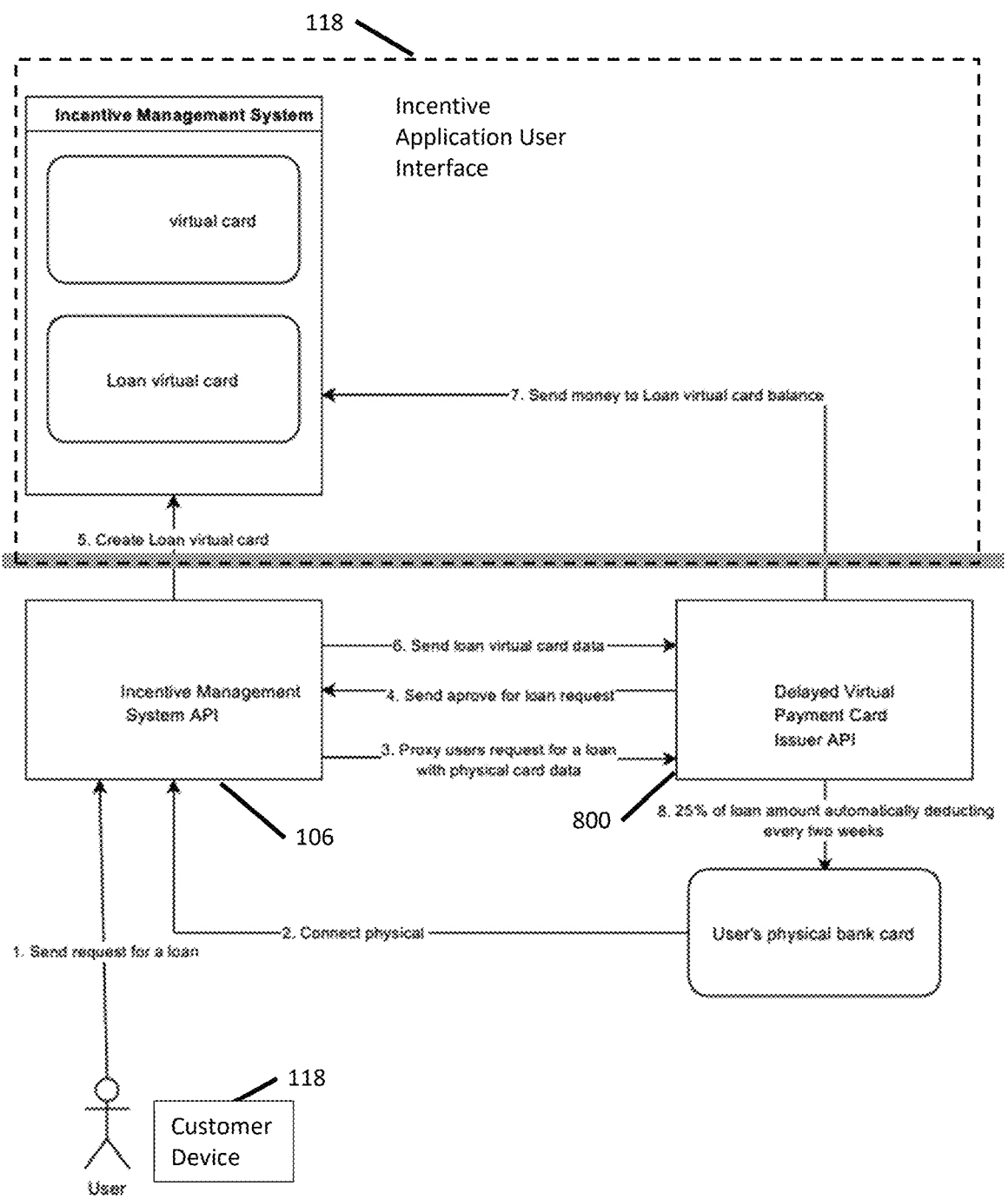
FIG. 10B is a simplified block diagram showing the relationship between the incentive management system and the delayed virtual payment card issuer and the creation of a virtual payment card for delayed payments where the virtual payment card is created by the incentive management system.
Figure 11:
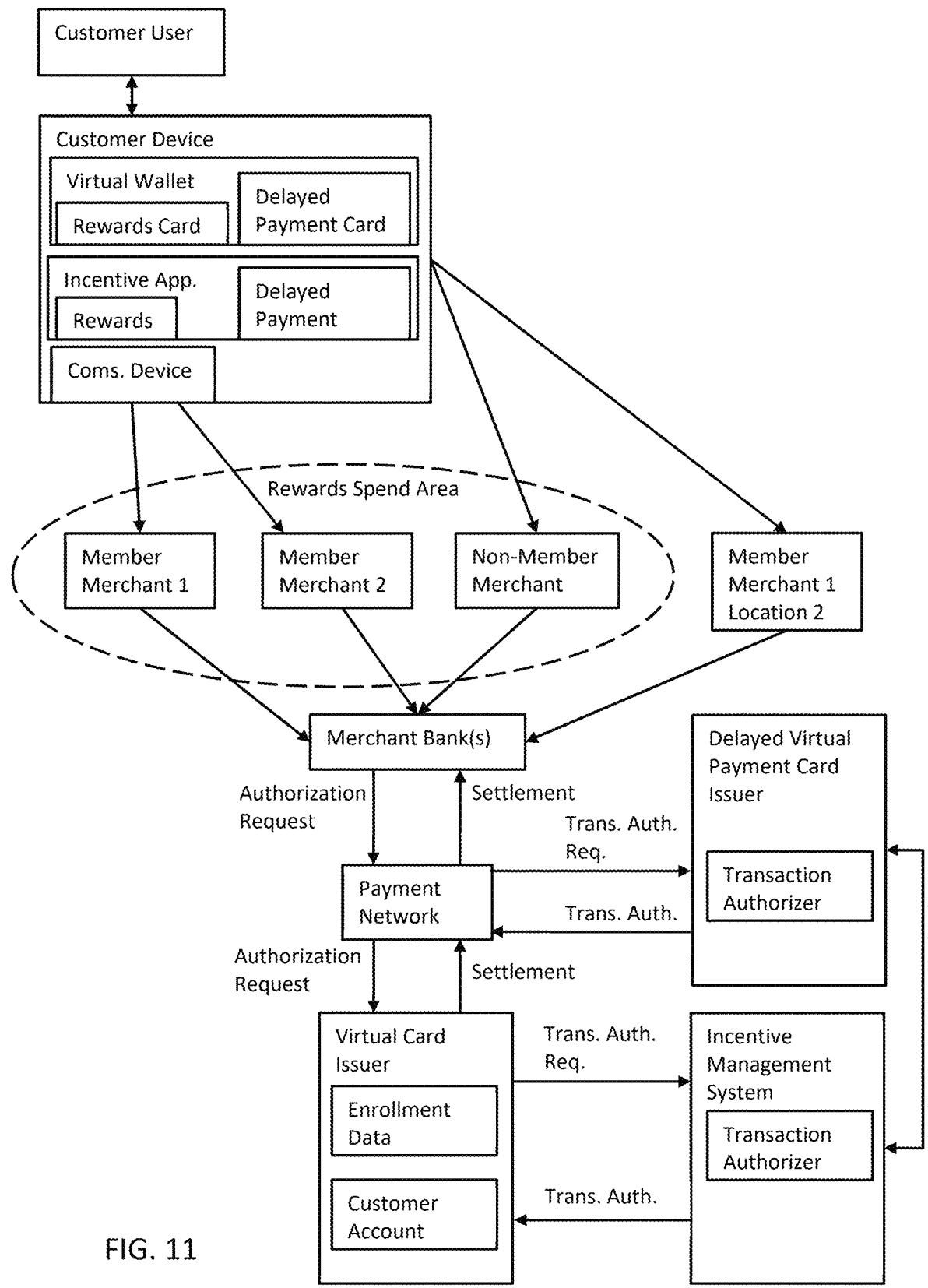
FIG. 11 is a simplified block diagram showing the relationship between system and devices within and related to the transaction incentivizing system as pertains to customers redeeming rewards and customers utilizing a delayed payments service of the system and devices disclosed.

Referring generally to FIGS. 1-12 the system and method for applying a matching algorithm/recommendation algorithm using transaction data acquired from a geographically limited rewards system is illustrated. FIGS. 1-7B and the associated description describe how the rewards portion of the system, including transaction data acquisition, operates. FIGS. 8A-10 and the associated description describe the overall system architecture and how acquired data is used in various analytical processes including, for example, calculation of customer lifetime value and providing recommendations to customers. FIGS. 11-12 and the corresponding description focus specifically on the application of a matching/recommendation algorithm using the transaction data acquired using the techniques described throughout and with respect to the systems and methods providing geographically limited rewards in response to transactions between enrolled payment cardholders and enrolled merchants.

Referring generally to FIGS. 1-7B, a system 100 and associated methods provide incentives to customers to shop in a prescribed geographic area. The system 100 is adapted and configured to interact with existing payment networks 102 to facilitate the incentivizing of repeat transactions within a geographic area. Generally, the system 100 interacts with the payment network 102 to identify transactions by customers participating in a rewards/incentives program. For example, the system 100 identifies transactions by participating cardholders (e.g., people making purchases with debit or credit cards issued by financial institutions to extend credit to or facilitate purchases by cardholders) by using transaction data related to the participating user's card received from the payment network 102 and identifying data associated with participating cardholders.

The system 100 compares identified transactions by participating cardholders with merchant identification data to determine if the identified transaction by the participating cardholder (e.g., enrolled cardholder and/or enrolled user) is eligible to generate rewards for the participating cardholder. The merchant identification data corresponds to merchants participating in the rewards program (e.g., enrolled merchants). This identifies transactions between enrolled users and enrolled merchants and flags these transactions as rewards eligible. The comparison between the transaction data retrieved from the transaction data aggregator 104 and the enrolled merchant identification data is carried out by an incentive management system 106.

The system 100 applies a rewards factor (e.g., 15%) to the transaction amount of the identified rewards eligible transactions to determine a rewards amount for each transaction occurring between enrolled users and enrolled merchants. Rewards are calculated by the incentive management system 106. The system 100 transmits an instruction to a virtual card issuer 108 to apply the rewards amount to an account associated with the enrolled user who transacted with the enrolled merchant in the transaction that generated the rewards amount. The virtual card issuer manages the account and ties it to a virtual payment card that allows for the rewards to spent as cash provided that a transaction seeking to use rewards is authorized to proceed.

The system 100 authorizes or refuses to authorize transactions seeking to use rewards based at least in part on the geographic location in which the transaction to be authorized or denied is going to take place. This allows the system 100 to limit rewards spending to a specific geographic area, for example a shopping mall. In this way, the system 100 incentivizes repeat transactions with merchants within a limited geographic area, e.g., the shopping mall. The system 100 thereby drives traffic to physical shopping locations.

This system 100 thereby provides advantages in that repeat transactions with merchants within a specific geographic area are incentivized. The system 100 also advantageously allows earned rewards to be spent just like cash (although limited to a geographic area and/or participating merchants within the limited geographic area). This avoids the disadvantages of coupons which require that the coupons to be used in a very limited circumstance (e.g., with a specific merchant, with a specific product, with a minimum purchase, etc.) and that the coupons are unearned. In other words, traditional coupon rewards are limited in their ability to be applied and do not form a recurring relationship with merchants (specific merchants or general merchants within a geographic area).

The system 100 also provides an advantage over brand loyalty cards/rewards programs. Brand loyalty programs are more restrictive and only allow rewards to spend on further purchases with the same merchant/brand. These programs also do not typically have a geographic restriction on the spending of points. Such programs do not benefit a retail ecosystem such as a shopping mall but rather only benefit a single brand. Brand loyalty programs also do not allow for information sharing across brands or between brands/merchants and lessors (e.g., shopping mall operators). The system 100 provides for incentives for users to shop at a variety of brands with rewards earned from purchase from any participating merchant. The geographic limitation on spending of rewards and the cash-like nature allows the incentive to benefit a plurality of merchants and the geographic region.

The system 100 further provides an advantage over cashback style payment cards. Such payment cards have a disadvantage in that they allow rewards to be earned by any purchase with any merchant. This does not incentivize an ongoing relationship with a merchant or set of merchants. Although some cashback payment cards provide additional "bonus" rewards for shopping with a specific merchant or merchant category, these programs treat some merchants preferentially. The system 100 incentivizes merchant participation by not treating any participating merchant preferentially. Further, the system 100 limits rewards to rewards eligible transactions which occur between a user and an enrolled merchant. This incentivizes an ongoing relationship with the merchant which benefits the merchant more than a cashback payment card. In other words, the cashback payment card program benefits the payment card issuer by attracting further payment cardholders while the system 100 benefits merchants by incentivizing repeat purchases by users. A cashback payment card system further has a disadvantage in that the cashback can be spent anywhere and on any purchase. This does not allow for incentivizing repeat transactions within a specific geographic area. The system 100 does provide this advantage.

Referring now to FIG. 1, a payment network 102 and its relationship to geographically similar and geographically diffuse merchants is illustrated. In a traditional purchase with a payment card, a cardholder 110 presents the payment card to a merchant (e.g., merchant 1) at the merchant's point of sale device. This initializes the transaction. For example, the cardholder 110 or a merchant employee swipes the payment card such that information from the payment card is read by the merchant point of sale device. The merchant (e.g., merchant 1) seeks authorization for the transaction to proceed by transmitting an authorization request to the merchant's bank 112. The authorization request includes identification information—e.g., cardholder name, cardholder address, payment card number, payment card account number, card verification value (CVV) number, payment card expiration date, merchant name, merchant address, merchant identification (MID), terminal identification (TID), etc.—and transaction information—e.g., transaction amount, transaction time, etc.

The merchant bank 112 submits the transaction to the payment network 102 for authorization. The payment network 102 facilitates routing of the transaction authorization request such that the transaction authorization request reaches the appropriate issuing bank 114. The payment network 102 facilitates communication between merchants and payment card issuing banks. For example, the payment network 102 can be a network such as Visa, MasterCard, Discover, American Express, etc. The transaction authorization request is a digital message containing transaction information such as a payment cardholder identification, a merchant identification, a transaction amount, an authorization flag Boolean that can be set to true or false depending on whether the transaction has been authorized, a date/time of the transaction, an issuing bank identification or the like, and the digital message is formatted to be transmitted and handled using the systems and processes of the payment network 102 and the entities interacting with one another through the payment network 102.

The issuing bank 114 determines if the transaction authorization request should be approved or denied. For example, the issuing bank 114 can, as part of this determination, query the account of the cardholder 110 to determine if there is sufficient funds or credit for the transaction amount of the transaction for which authorization is sought, make a determination as to the probability of fraud, etc. This involves comparing information found within the received transaction authorization request to information contained within the issuing bank's database with respect to the payment cardholder identified in the transaction authorization request. For example, the issuing bank's computer systems can read the transaction amount from the authorization request and compare this to a balance held in the database records to ensure that adequate funds are present. In response to determining that the transaction is authorized, the issuing bank 114 will forward a payment, from the cardholder's account or with credit and charge the cardholder's account, to the payment network 102 such that the payment network 102 can route the payment to the merchant (e.g., merchant 1). The payment network 102, upon receipt of the payment from the issuing bank 114, forwards the payment to the merchant's bank 112 such that the transaction is settled. The payment is transmitted as a digital message formatted to be handled by the payment network 102 and associated components/actors. For example, the digital message in this case can include an amount equal to that of the transaction amount, a merchant bank identification, a merchant account identification, an instruction to credit the identified merchant account with the amount, or the like. Upon transmitting such a payment instruction, the issuing bank can debit the account of the payment cardholder identified in the transaction authorization request message.

If the issuing bank 114 determines that the transaction of the authorization request is not authorized (e.g., due to lack of funds, suspected fraud, etc.), then the issuing bank 114 transmits to the payment network 102 a refusal to authorize the transaction. The payment network 102 forwards the refusal to authorize to the merchant's bank 112. The merchant's bank 112 then forwards the refusal to the merchant (e.g., merchant 1's point of sale device). The refusal takes the form of a digital message of the type generally described herein and throughout. The message includes, for example, information identifying the transaction that has been refused authorization (e.g., transaction identification number, merchant identification, cardholder identification), an indication that the transaction authorization request has been refused (e.g., a Boolean flag set to false), text providing an explanation for the refusal (e.g., insufficient funds), or the like.

The payment network 102 similarly handles transactions between a plurality of payment cardholders and a plurality of merchants (e.g., merchant 2, merchant 3, merchant 4, etc.). The payment network 102 is adapted and configured to handle payment card transactions generally and regardless of the geography of merchants and any association of merchants. For example, if merchants 1-3 are in a shopping mall and merchant 4 is remote, the payment network 102 handles transaction involving all four merchants identically. Therefore, the payment network 102, alone, cannot differentiate based on geography for the purposes of the providing a rewards program with geographical restricted redemption of the type described herein with respect to system 100. However, the payment network 102 can be used, in addition to other systems and components, by the system 100 in order to facilitate the functions of the payment network 102 described herein.

Figure 2:
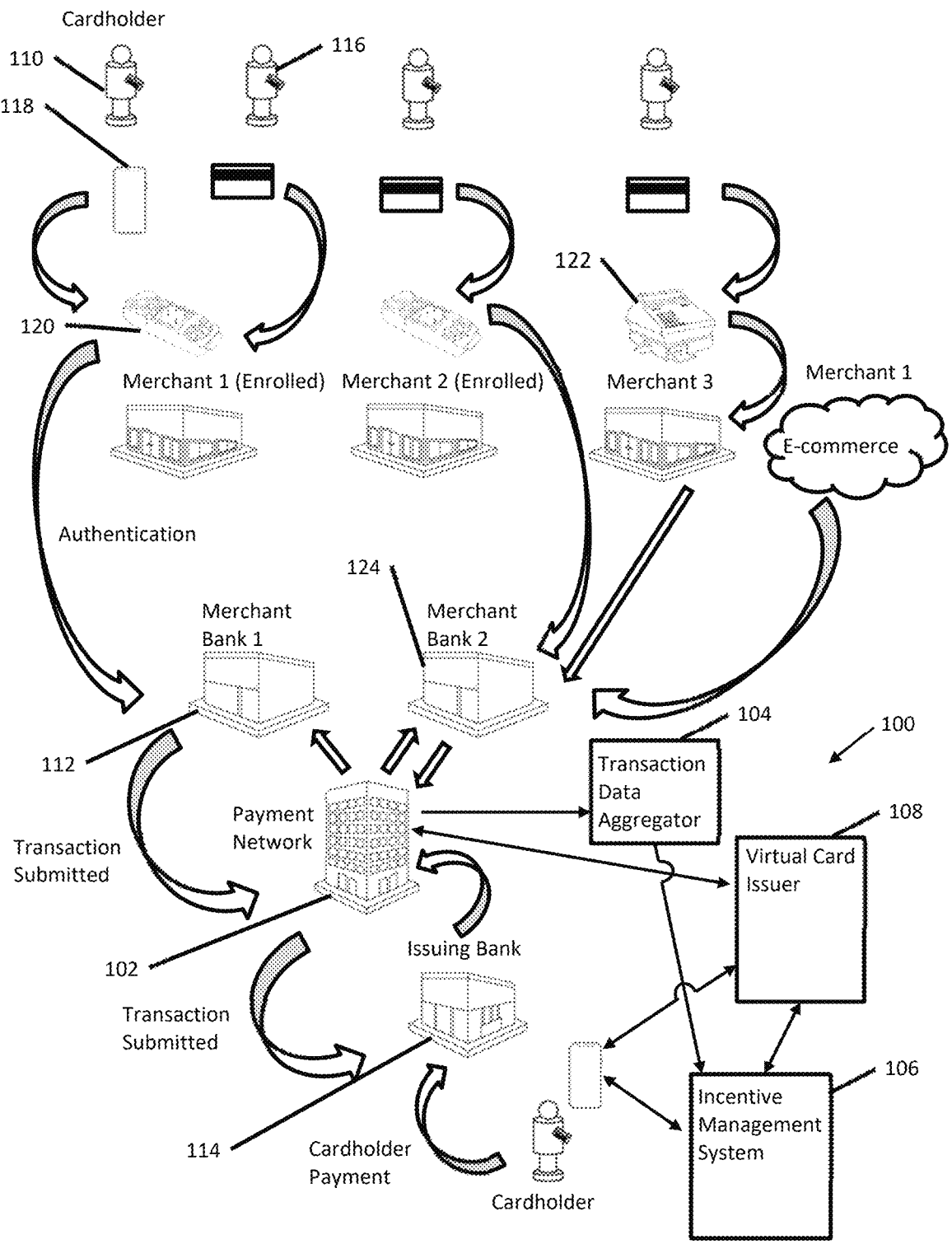
FIG. 2 is a schematic diagram illustrating the relationship between a multi-party payment card system and systems that enable the incentivizing of repeat transactions with merchants within a prescribed geographic area using payment processing network data.

Referring now to FIG. 2, system 100 and its relationship to cardholders, merchants, the payment network 102, and others is illustrated according to one embodiment. Generally, for a cardholder 110 who is enrolled with the incentive management system 106, the system 100 operates as follows. Enrollment, specifically, is described herein later and with respect to FIGS. 4A-4B. Cardholder 110 earns rewards by making purchases with a payment card at enrolled merchants, in this example merchants 1 and 2. Enrollment of merchants is described with greater detail herein later and with respect to FIGS. 5A-5B. The process of cardholder 110 making a purchase with a payment card operates as previously described with respect to any general transaction. The payment network 102 handles the transaction by moving transaction data between merchant 1, the merchant bank 112, and the issuing bank 114 (e.g., the bank issuing cardholder's 110 payment card).

Transaction data associated with the transaction is captured by the transaction data aggregator 104 which is in communication with the payment network 102. Acquisition of the transaction data can occur in a variety of ways. In one embodiment, the transaction data aggregator 104 captures transaction data for all transactions handled by the payment network 102 (e.g., as transaction authorization requests and settlements are transmitted through the payment network 102, the transaction data aggregator 104 temporarily receives the associated messages or copies of the associated messages and writes the embedded information to a database operated by the transaction data aggregator). In an alternative embodiment, the transaction data aggregator 104 monitors all transactions but captures and stores transaction data only for enrolled cardholders (e.g., cardholder 110). For example, the transaction data aggregator can maintain a database of cardholder identification data for enrolled cardholders 110 and query each transaction monitored (e.g., each message or a copy of each message handled by the payment network 102) to determine if the queried transaction includes cardholder identification data that matches cardholder identification data stored in the database of enrolled cardholders. In a further alternative, the transaction data aggregator periodically (e.g., daily, hourly, every minute, etc.) queries the payment network 102, which maintains a database of transactions (containing the information embedded in messages), for transactions which include cardholder identification data matching cardholder identification data stored in the database of enrolled cardholders by the transaction data aggregator 104. In response, the transaction data aggregator receives all transactions from the payment network 102 which include cardholder identification matching that of enrolled cardholders.

Preferably, the cardholder identification data used to track enrolled cardholders 110/users and used to identify transactions made by the enrolled cardholders 110 is an account number or payment card number corresponding to a payment card held by the enrolled cardholder 110. In other embodiments, the cardholder identification data can be one or more of a cardholder name, cardholder address, or other identifying information.

The transaction data aggregator 104 identifies and retrieves these transactions based on an instruction received from the incentive management system 106 (e.g., the instruction being a digital message including an executable request for database elements related to a transaction identification, payment cardholder identification, merchant identification, or the like). For example, the incentive management system 106 transmits a request for transaction data associated with at least one enrolled user. In response to the request, the transaction data aggregator 104 acquires and returns the relevant transactions (e.g., by executing program instructions contained with request digital message identifying the database record by a merchant/payment cardholder identification and requesting associated database entries to be read from the database and returned). In some embodiments, the incentive management system 106 does not communicate directly with the payment network 102. This has the advantage of allowing the transaction data aggregator 104 and the incentive management system 106 to operate in parallel.

Once the incentive management system 106 receives transactions involving the enrolled cardholder 110, the incentive management system 106 identifies transactions that are eligible for rewards. To identify rewards eligible transactions, the incentive management system 106 checks each received transaction by an enrolled cardholder 110 to determine if the transaction was with an enrolled merchant (e.g., this check is performed by querying a database of the received transactions using a database or matrix of merchant identifications and selecting, flagging, copying, or the like the database entries with enrolled merchant identifications). For example, the incentive management system 106 identifies merchant identification data in the transaction known to involve an enrolled cardholder 110. The identified merchant identification data is compared (e.g., using database comparison techniques) to a database of merchant identification data for enrolled merchants. If there is a match, the transaction being analyzed is flagged as rewards eligible. If the merchant identification data found in the transaction is not found in the database of enrolled merchants, then the incentive management system 106 determines that the transaction is not rewards eligible. Transactions that are rewards eligible can be put into a database of rewards eligible transactions or can be handled on an individual basis as they are identified (e.g., database entries that are identified as including enrolled merchant identifications are copied to extract all related database entries and the entries are written to a new database such as the database of rewards eligible transactions).

The incentive management system 106, in conjunction with the transaction data aggregator 104, captures transactions with an enrolled merchants e-commerce website in the same manner and evaluates if the transactions are rewards eligible in the same manner. This allows for the incentive management system 106 to provide rewards made for online purchases between enrolled cardholders and enrolled merchants.

Using the rewards eligible transactions identified by the incentive management system 106, the incentive management system 106 calculates a rewards amount. To do this, the incentive management system 106 identifies a transaction amount in the transaction data associated with the rewards eligible transaction (e.g., by querying the database of rewards eligible transactions for each entry to identify the amount element of the entry). Using the transaction amount, the incentive management system 106 applies a rewards factor to determine the rewards amount. For example, the rewards factor can be between 0.1 and 0.2, inclusive, and can be more preferably 0.15. It has been found that 0.15 is an optimum rewards rate to increase participating by both cardholders and merchants. The determined rewards amount is either used as it is calculated or placed in or added to a database that includes the associated enrolled cardholder identification data. Again, these steps can be performed on a transaction by transaction basis as rewards eligible transactions are identified as described above or can be handled in a batch process if the identified rewards eligible transactions are placed into a database of rewards eligible transactions.

After determining an awards amount for a transaction or a set of transactions (the amounts placed in a database), the incentive management system 106 prepares an instruction and sends the instruction to the virtual card issuer 108 to apply the rewards amount to an account for the enrolled cardholder who participated in the transaction for which rewards were calculated. The instruction is a digital message including the rewards amount and identifying the associated enrolled payment cardholder/account to be credited, and includes a program instruction to be executed by the virtual card issuer to credit the account. The instruction includes cardholder identification information and the rewards amount such that the virtual card issuer 108 can increase an account balance of the enrolled cardholder by the rewards amount. The account maintained by the virtual card issuer 108 corresponds to a virtual payment card usable by the enrolled cardholder. Again, the balances can be updated serially or in a batch process.

For transactions involving non-enrolled cardholders (e.g., cardholder 116), the transaction data aggregator 104 does not capture these transactions, even if the transaction involves an enrolled merchant.

It should be understood that the identification of rewards eligible transactions between enrolled merchants and enrolled cardholders 110 can be identified using any suitable order of steps or techniques. For example, in an alternative embodiment, the same steps are performed but in reverse order. The transaction data aggregator 104 identifies transactions involving enrolled merchants by interacting with the payment network 102 in the manner described above with respect to the enrolled cardholder identification data (e.g., querying the payment network 102 to identify transaction including enrolled merchant identification data such as a merchant identification, terminal identification, merchant name, or the like. Those transactions received from the payment network by the transaction data aggregator 104 and forwarded to the incentive management system 106 are then compared against a database of enrolled cardholders 110 to identify transactions between the two enrolled parties. This is done in the same manner described above with respect to comparing the received transaction to the database of enrolled merchants (e.g., the comparison executed using database querying/comparison techniques of the type described herein). For transactions involving merchants not enrolled (e.g., merchant 3), the transaction is not captured by the transaction data aggregator even if the transaction is between the non-enrolled merchant (e.g., merchant 3) and an enrolled cardholder.

It should further be understood that the operations described above can be carried out using databases or any other suitable data structure and/or data processing technique.

Earning rewards and processes performed by the system 100 are described later herein with additional detail and with respect to FIGS. 6A-6B.

Still referring to FIG. 2, an enrolled cardholder 110 can spend accumulated rewards using a virtual payment card issued and maintained by the virtual card issuer 108. The account is established by the virtual card issuer 108 in response to an instruction from the incentive management system 106 when the incentive management system 106 enrolls a cardholder 110. In some embodiments, the instruction is a digital message including cardholder identification information and an executable programming instruction that is formatted to cause the virtual card issuer 108 to execute the programming instruction according to its own program and establish the account. The virtual payment card is held within a virtual wallet and/or application running on the enrolled cardholder's device 118 (e.g., a smartphone), sometimes also referred to herein as enrolled payment cardholder device 118, enrolled payment cardholder's device 118, customer device 118, enrolled customer device 118, enrolled cardholder device 118, enrolled cardholder's device 118, or user device 118. The application can be downloaded by the cardholder 110 as a portion of the enrollment process. For example, and without limitation, the enrollment can be requested through the application with the application communicating with the incentive management system 106.

When making a purchase with rewards, the enrolled cardholder 110 presents the virtual payment card at the merchant's point of sale device 120. In the case where the merchant is not an enrolled merchant (e.g., merchant 3), the non-enrolled merchant's point of sale device 122 transmits a transaction authorization request through the merchant bank 124 (e.g., merchant bank 2) and payment network 102 to the issuer of the virtual payment—the virtual card issuer 108. In this manner, the transaction is handled like any typical payment card transaction. Upon receiving the transaction authorization request (which is, for example a digital message routed by the payment network 102), the virtual card issuer 108 forwards the request to the incentive management system 106 for processing. The virtual card issuer 108 can forward the transactions authorization request to the inventive management system 106 as a digital message including the information of the transaction authorization request using any suitable technique (e.g., message routing, use of an API, memory sharing, packet forwarding, or the like). In alternative embodiments, the virtual card issuer 108 performs the transaction authorization functions described herein as performed by the incentive management system 106.

When the incentive management system 106 receives the transaction authorization request, the incentive management system 106 first determines if the transaction that is the subject of the authorization request is with an enrolled merchant. For example, the incentive managements system 106 retrieves from the authorization request a merchant identification and compares the merchant identification to a database of enrolled merchant identifications. If the merchant identification of the transaction authorization request is not found in the database of enrolled merchants then the incentive management system 106 does not authorize the transaction. The refusal is transmitted to the virtual card issuer 108 which then communicates the refusal to authorize back through the payment network 102 and to the merchant point of sale device 122.

Moving to a second scenario, if the enrolled cardholder 110 is transacting with an enrolled merchant, the incentive management system 106 determines that the merchant identification of the transaction authorization request matches a merchant identification of an enrolled merchant held within a database of enrolled merchant identification information. This determinization can be made, for example, by querying the database of enrolled merchant identification with the merchant identification read from the transaction authorization request and if a match is found in an existing record returning an indication that such a match is found. These operations are carried out using suitable database instructions and arguments of the type described herein and known in the art. The indication can be an instruction, flag, conditional statement input, or the like and allows a program of the incentive management system 106 to further execute the steps/methods/functions described herein.

The incentive management system 106 also controls authorizations of transaction requests involving the virtual payment card in order to restrict spending of rewards, by the virtual payment card, to a specific geographic area. In one embodiment, this is achieved by controlling the enrollment of merchants such that only merchants within the specific geographic area are enrolled. For example, a merchant enrollment system of the type described herein can receive merchant location information (e.g., census tract, address, global positioning system coordinates, or the like) input digitally through a web portal and can compare the merchant location information to location information defining the geographic area in which rewards may be spent (e.g., compare using database querying/comparing techniques of the type described herein the received merchant address or component thereof to a listing of addresses or components thereof that fall within the geographic area).

In embodiments where merchant enrollment is controlled, once a match is found between the merchant identification of the transaction authorization request and a merchant identification in the database of enrolled merchants, the incentive management system 106 causes the transaction to be authorized. The transaction necessarily being within the specific geographic area. The incentive management system 106 causes the transaction to be authorized by transmitting an instruction (e.g., digital message with program executable instructions) to the virtual card issuer 108 to transmit an authorization through the payment network 102 and the merchant bank 112 (e.g., merchant bank 1) and to the merchant point of sale device 120. In some embodiments, the instruction is a digital message formatted (e.g., using an API) to be read by systems of the payment network 102 and includes delineated message elements such as a destination address (e.g., merchant bank identification, merchant identification, or the like), a sending address (e.g., virtual card issuer identification), transaction amount, authorization information (e.g., a flag or Boolean set to indicate that the transaction is authorized), additional transaction information, or the like.

In an alternative embodiment, the incentive management system 106 determines if the transaction of the transaction authorization request is occurring within the prescribed geographic area based on a portion of a merchant address included within the transaction authorization request. The incentive management system 106 compares a portion of a merchant address included within the transaction authorization request to a portion of an address defining the geographic area within which rewards can be spent. The portion of the address defining the geographic area is predefined and stored within the incentive management system 106. For example, the portion of the address at issue can be a street name, a zip code, a county, a city, a census tract, or a state. This comparison is carried out in some embodiments, by the incentive management system 106 reading the transaction authorization request digital message and extracting an element of the message that includes the address of the merchant. The database of enrolled merchants is queried using the extracted address element (e.g., using a suitable database command of the type described herein) and if a match is found with an existing database entry element, then the program executed by the incentive management system 106 proceeds to format and transmit an instruction authorizing the transaction of the type described herein.

In a further alternative embodiment, the incentive management system interacts with the enrolled cardholder's device 118 and the application running on the device to acquire position data that is used to determine if the transaction that is the subject of the authorization request is occurring within the prescribed geographic area. In response to receiving the transaction authorization request, the incentive management system 106 transmits a request to an enrolled payment cardholder device 118 for global positioning system data. The request is formatted to cause the application running on the enrolled payment cardholder device 118 to retrieve global positioning system data and transmit the global positioning system data to the incentive management system 106. In one embodiment, the request is a digital message communicated through the internet and an application API and includes in its payload an instruction formatted to be executed by the application on the enrolled payment cardholder device 118 that causes the device to acquire GPS coordinates and transmit a return message including in its payload the acquired GPS coordinates. The messages also include other relevant information/elements such as a sender address, recipient address, message identifier, executable instructions, and the like.

The incentive management system 106 receives, from the enrolled payment cardholder device 118, global positioning system data and associates that global positioning system data with the transaction authorization request. In some embodiments, the global positioning system data is received via return message through the internet of the type described above. The incentive management system 106 compares the global positioning system data associated with the transaction authorization request to a geofence boundary defining the prescribed geographic area in which rewards can be spent at enrolled merchants. The incentive management system 106 further determines that the transaction of the transaction authorization request occurred within the prescribed geographic area when the global positioning system data associated with the transaction authorization request corresponds to a location within the geofence boundary. For example, in one embodiment, the incentive management system extracts from the received message the global positioning system data in the form of longitude and latitude coordinates. The incentive management system then compares the received longitude and received latitude to a predetermined range(s) of longitude and latitude (e.g., upper and lower bounds) that define the geographic area. If the received values are between the upper and lower bounds then the incentive management system 106 has determined that the transaction is occurring within the prescribed geographic area and can proceed with authorizing the transaction as described herein.

Regarding redemption of rewards, it should be understood that in some embodiments, a transaction will be authorized that allows for partial payment with rewards via the virtual payment card. If the balance in the account of the virtual payment card does not exceed the transaction amount, the transaction can be reformatted to apply the entire rewards balance with the remainder being paid by the enrolled cardholder through a separate transaction (e.g., using cash or another payment card).

Regardless of the process used to determine if the transaction of the transaction authorization request is occurring within the prescribed geographic area, the prescribed geographic area can be or correspond to a shopping mall, outlet mall, community improvement district, tax increment financing district, or commercial district. The geographic location can also correspond to a single retailer, the single retailer offering a plurality of differently branded products for sale. In such a case and/or in other cases, the merchant is a seller of a specific brand of product. For example, the merchant can be a department store, grocery store, restaurant, clothing retailer, accessory retailer, pharmacy, technology retailer, pet retailer, toy retailer, general merchandise retailer, or service provider.

Figure 3:
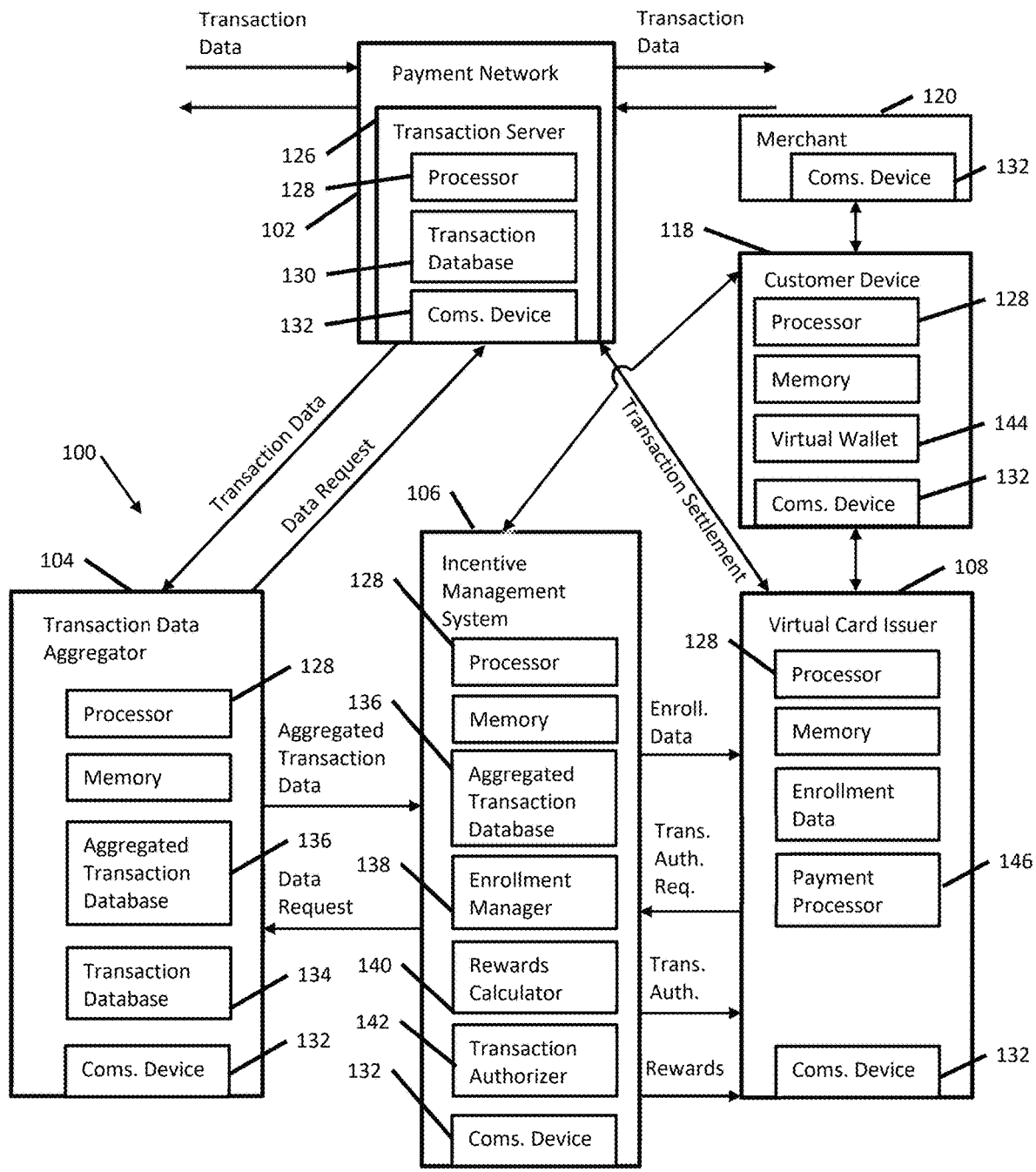
FIG. 3 is a simplified block diagram illustrating the relationship between the multi-party payment system network, a transaction data aggregator, incentive management system, virtual card issuer, customer device, and merchant that enable the incentivizing of repeat transactions by customers at specific merchants.

Referring now to FIG. 3, the system 100 is shown in greater detail in relationship to the payment network 102. The payment network 102 (e.g., payment processor, payment processing network, etc.) handles transaction data for transaction authorizations and transaction settlements of the type and in the manner described herein. To process authorizations and transaction, the payment network 102 includes at least one transaction server 126. In some cases, the payment network 102 includes a plurality of transaction servers 126 that can be geographically dislocated. Each transaction server 126 includes a processor 128, a transaction database 130, and a communications device 132. These components, along with other components not shown (e.g., memory, a power source, etc.), carry out the functions of the payment network and transaction server described herein. The processor 128 can be a special purpose or a general purpose processor device. As will be appreciated by persons skilled in the relevant art, processor 128 can also be a single processor in a multi-core/multiprocessor system, such system operating alone, or in a cluster of computing devices operating in a cluster or server farm. Processor device 128 is connected to the communications device 132 and the transaction database 130 with, for example, a bus, message queue, network, or multi-core message-passing scheme. The transaction server 126 can further include memory to which one or more other components are connected for communication. For example, the transaction server 126 can include random access memory (RAM), a hard disk drive, removable storage drive, a floppy disk drive, a magnetic tape drive, an optical disk drive, a flash memory, or the like. Programs that facilitate the functions described herein can be stored in memory and executed by the processor 128.

The transaction database 130 is stored in memory of the transaction server 126 or a similar component within the payment network 102. The transaction database 130 stores transaction information for a plurality of transactions and can store the transaction transitorily, for a period of time, or permanently. Transaction information can include any of the information described herein and or other information. For example, and without limitation, transaction information can include cardholder identification information (e.g., name, address, telephone number, payment card number, etc.), an account number corresponding to the payment card, a card verification value, a payment card expiration date, merchant identification information (e.g., merchant identification number, name, address, telephone number, etc.), a terminal identification number corresponding to a point of sale device, transaction amount, the product being purchased (e.g., a stock keeping unit code), the date, the time, the location (e.g., merchant address), and or other transaction information.

The communications device 132 is in communication internally with the processor 128, transaction database 130, memory, and/or other components of the transaction server 126. The communications device 132 allows for communication with external devices (e.g., merchant bank servers, issuing bank servers, merchant point of sale devices, the transaction data aggregator 104, the incentive management system 106, virtual card issuer 108, etc.). The communications device 132 can be or include a modem, a network interface (such as an Ethernet card), a communications port, a PCMCIA slot and card, or the like. Information communicated through the communications device 132 can be in the form of signals, which can be electronic, electromagnetic, optical, or other signals capable of being transmitted/received by a communications device.

The transaction data aggregator 104 likewise includes a processor 128, memory, and communications device 132 of the type previously described with respect to the transaction server 126. The transaction data aggregator 104 also includes a transaction database 134 that includes all or a subset of the transaction stored in the transaction database 130 of the transaction server 126. Additionally, or alternatively, the transaction data aggregator 104 can include an aggregator transaction database 136. In one embodiment, the transaction data aggregator sends a data request to the payment network, using the associated communications devices 132, with the data request requesting all transaction data. For example, the data request can be a message formatted to be handled by the payment network using an application programming interface or the like and include a data request element, request target element, information return destination element, or other like information that indicates what the request is, how to handle the request, and to where and/or in what format to return data that is the subject of the request. In such an embodiment, the transaction data is then stored, at least temporarily, in the transaction database 134. For example, the payment network 102 upon receipt of the data request executes the request using the elements of the request and transmits the requested information to the transaction data aggregator 104, with the transaction aggregator writing the received transaction data to the transaction database 134 as it is received. The transactions can be narrowed to create the aggregated transaction database 134 such that the aggregated transaction database 134 includes only those transactions involving enrolled cardholders (or in alternative embodiments enrolled merchants).

In an alternative embodiment, the data request requests transaction data involving only enrolled cardholders (or in alternative embodiments enrolled merchants) and the payment network 102 parses the request. In such a case the returned transaction data is stored directly in the aggregated transaction database 134. The data request in such cases includes cardholder (or in alternative embodiments merchant) identification information such that the relevant transactions can be identified. Such information typically includes at least an identification number (e.g., payment card number, merchant identification number, etc.) but can include any of the identification information described herein.

The transaction data aggregator 104 is adapted and configured to receive (e.g., via the communications device 132) a data request from the incentive management system 106. The data request is for transactions made by enrolled payment cardholders 110 (or in alternative embodiments transaction made by enrolled merchants). The data request includes enrolled payment cardholder (e.g., enrolled user/enrolled customer) identification data of the type described herein (e.g., payment card number). The incentive management system 106 receives, in response to the data request, aggregated transaction data from the transaction data aggregator 104. The received transaction data is added to an aggregated transaction database 134 stored in the incentive management system 106. The incentive management system 106 queries the aggregated transaction database 134 with enrolled merchant identifications stored in an enrolment manager 138. This identifies rewards eligible transactions that have occurred between enrolled payment cardholders and enrolled merchants. In other embodiments and as previously described, the procedure can be reversed in that the incentive management system 106 receives transactions with enrolled merchant identification data from the transaction data aggregator 104 and cross checks the transactions with enrolled cardholder identification data stored in the enrollment manager 138 to identify rewards eligible transactions.

The enrollment manager communicates with at least a customer device 118 to enroll customers/payment cardholders. The enrollment manager also includes identification information corresponding to enrolled merchants.

Once rewards eligible transactions are identified, the incentive management system 106 calculates rewards for each rewards eligible transaction using a rewards calculator 140. The rewards calculator 140 calculates rewards for each eligible transaction using the methods described herein. For example, the rewards calculator 140 is a program, function, sub-routine, or the like and applies a rewards factor to the transaction amount for each rewards eligible transaction held in a database of such transactions. The rewards amount is appended as an additional datum for each transaction held within the rewards eligible transaction database. Alternatively, a new database is created that includes at least the rewards amount and enrolled payment cardholder identification information.

The incentive management system 106 communicates earned rewards to the virtual card issuer 108 so that the virtual card issuer can update an account balance associated with the account of the enrolled payment cardholder. This is communicated to the virtual card issuer 108 by an instruction sent from the incentive management system. The instruction causes the account of the enrolled payment cardholder to be credited by the rewards amount. The instruction includes enrollment data such as enrolled cardholder identification information. This information is used by the virtual card issuer to setup and identify accounts for virtual payment cards associated with individual enrolled payment cardholders (e.g., users).

The incentive management system 106 also communicates the earned rewards to the enrolled customer device 118 to cause an application running thereon to reflect the updated account balance. The communication causes the application to update account balances associated with the virtual payment card held within the customer device's 118 virtual wallet 144. This interaction can take the form a push notification sent by the incentive management system 106 to the enrolled payment cardholder device 118 such that an application handles the push notification and updates the account balance visible within the application/virtual wallet 144. In alternative embodiments, this is handled by the virtual card issuer 108 when it receives the instruction to update the balance.

The incentive management system 106 can also communicate directly with an enrolled payment cardholder's device 118 (e.g., customer device) to update an account balance within a virtual wallet 144, inform the enrolled payment cardholder that rewards have been earned, or send or request other information. For example, the incentive management system 106 can request cardholder identification information as part of an enrollment process. In some embodiments, the incentive management system 106 also interacts with the customer device as relates to gathering information about the payment cardholder and presenting offers/promotions, or the like. For example, the incentive management system 106 requests inputs for a matching algorithm/prediction algorithm to associate an enrolled payment cardholder with potential/likely purchases that the enrolled payment cardholder can make if informed of them. Such inputs can include demographic information (e.g., age, race, gender, sex, marital status, height, weight, shoe size, annual income, address, etc.), brand interest/preference information (e.g., brands of interest, previously purchased brands, etc.), category interest/preference information (e.g., interest in different types of products, interest in price point of products, etc.), and other information.

When transactions using rewards are initiated by an enrolled payment cardholder, the transaction authorization request is initially communicated to the virtual card issuer 108. The virtual card issuer 108 transmits the transaction authorization request to the incentive management system 106 which handles the transaction authorization request using a transaction authorizer 142. The transaction authorizer 142 is a program, function, sub-routine, or the like and determines whether to authorize the transaction that is the subject of the transaction authorization request (e.g., by determining if the transaction is with an enrolled merchant and is occurring within a prescribed geographic area). The incentive management system 106 transmits the transaction authorization or refusal to authorize to the virtual card issuer 108.

The incentive management system 106 does not communicate directly with the payment network 102 including the transaction server 126. As previously explained, this provides several advantages including allowing the components of the system 100 to operate in parallel thus increasing efficiency.

The virtual card issuer 108 communicates with the incentive management system 106 to get transaction authorization requests authorized or denied. The virtual card issuer 108 also communicates with the incentive management system 106 to receive enrollment data corresponding to enrolled payment cardholders. This allows for the virtual card issuer 108 to establish (i.e., issue) virtual payment cards and associated accounts such that earned rewards can be stored and spent by enrolled payment cardholders. The virtual card issuer 108 also communicates with the incentive management system 106 to receive information regarding rewards earned by the enrolled payment cardholder. In response to receiving an instruction to apply rewards, the virtual card issuer uses a payment processor 146 (e.g., a program, function, sub-routine, or the like) to credit the account of the enrolled payment cardholder identified in the instruction. The virtual card issuer 108 also interacts with the payment network 102 (e.g., transaction server 126) and the incentive management system 106 to receive transaction authorization requests and authorization or decline instructions from the incentive management system 106. Likewise, the virtual card issuer 108 operates as an issuing bank to settle authorized transactions and communicate when transaction authorization requests or denied. The virtual card issuer 108 can also communicate rewards account balances to the incentive management system 106 for authorization determinations or make that determination itself as part of the transaction authorization process (e.g., does the enrolled payment cardholder have a sufficient balance to cover the transaction amount). These and/or other functions are accomplished using the payment processor 146, processor 128, communications device 132, memory, or other components/processes. In some embodiments, the virtual card issuer 108, as the issuer of the virtual payment card, does not make transaction authorization determinations of any type. Instead those determinations are made by the incentive management system 106 as described herein.

In some embodiments, the virtual card issuer 108 also interacts with the customer device 118 to update account balances associated with the virtual payment card held within the customer device's 118 virtual wallet 144. This interaction can take the form of a push notification sent by the virtual card issuer 108 to the enrolled payment cardholder device 118 such that an application handles the push notification and updates the account balance visible within the application/virtual wallet 144. In alternative embodiments, these functions are handled by the incentive management system 106 as described herein. In alternative embodiments, the virtual card issuer 108 does not communicate directly with the customer device 118 (the communication being instead handled by the incentive management system 106 and payment network 102).

The customer device 118 is any device suitable for running an application of the type described herein and communicating with a merchant point of sale device 120. The customer device can be, for example, a smartphone device having a processor, memory, communications device 132, and be capable of maintaining a virtual wallet 144. The customer device 118 communicates at least with the incentive management system 106 and the merchant point of sale device 120. The customer device 118 communicates with the merchant point of sale device 120 (e.g., using near field communication, Bluetooth communication, Wi-Fi communication or the like) to provide at least a virtual payment card account number associated with the enrolled payment cardholder and the account associated with the enrolled payment cardholder's rewards. This allows a transaction to be initiated. In response, the merchant point of sale device 120 transmits an authorization request through the payment network 102 and to the virtual card issuer 108.

It should be understood that the communications using the communications devices 132 can be made using any suitable technique to facilitate interoperability of the devices/systems/servers that are communicating. For example, the data request can be formatted to take advantage of an application programming interface (API) or other system that allows for the devices to communicate with one another. In this manner, the format of instructions, requests, returned information, and the like can be uniform or cross-operable between different components of the system.

Figure 4A:
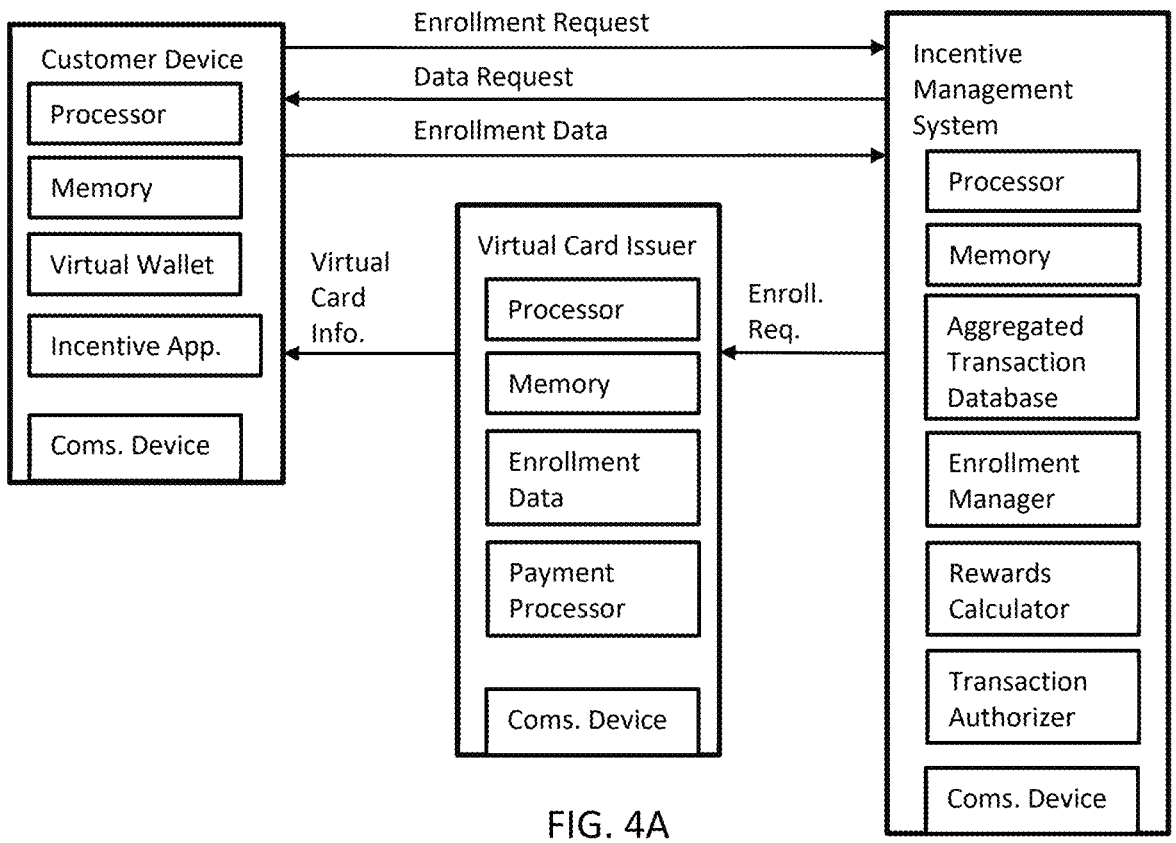
FIG. 4A is a simplified block diagram showing the communication between a customer device, incentive management system, and virtual card issuer as pertains to enrolling a customer such that the customer can earn and spend rewards.
Figure 4B:
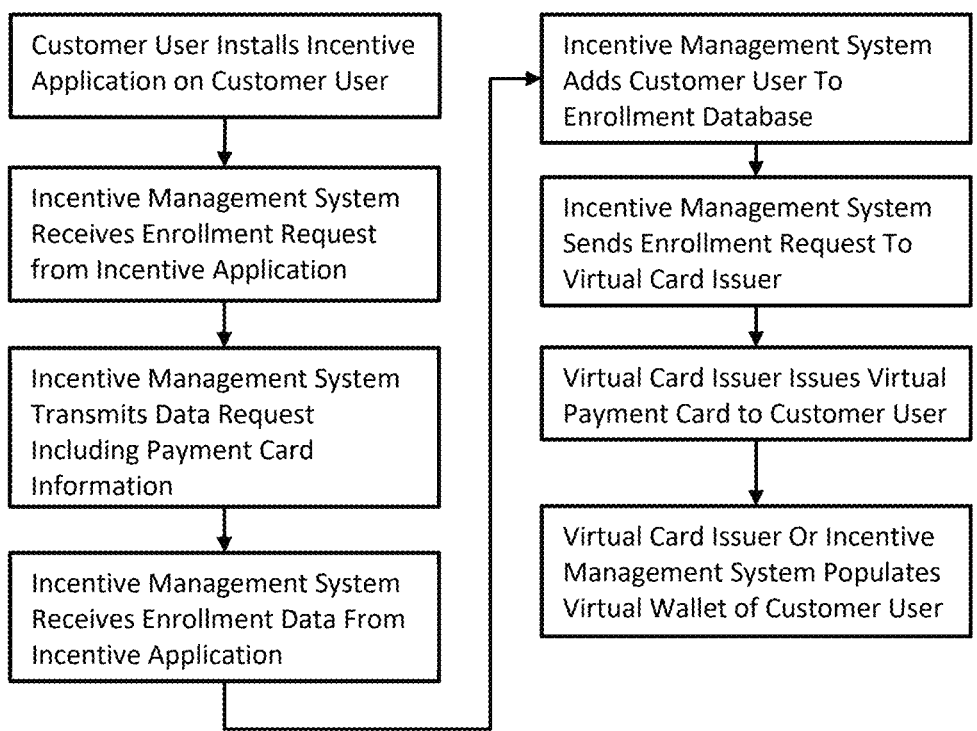
FIG. 4B is a flow chart showing steps of a method of enrolling a customer such that the customer can earn and spend rewards.

Referring now specifically to FIGS. 4A-4B, the process of enrolling a payment cardholder is shown in more detail and according to one embodiment. FIG. 4A shows a schematic of the data flow between the customer device 118, incentive management system 106, and virtual card issuer 108 in the context of enrolling the payment cardholder. FIG. 4B shows a flowchart illustrates the steps taken to enroll the payment cardholder.

Figure 5A:
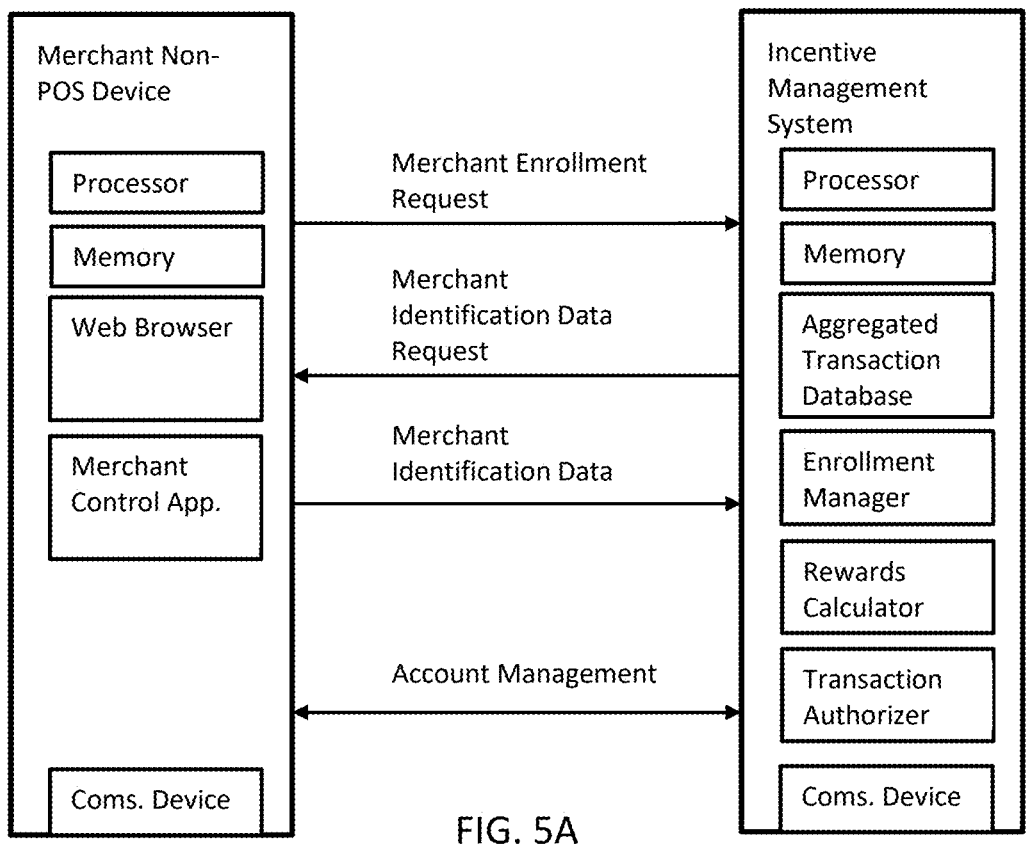
FIG. 5A is a simplified block diagram showing the communication between a merchant device and the incentive management system as pertains to enrolling the merchant such that the merchant can provide customer rewards and receive payments by customer rewards.
Figure 5B:
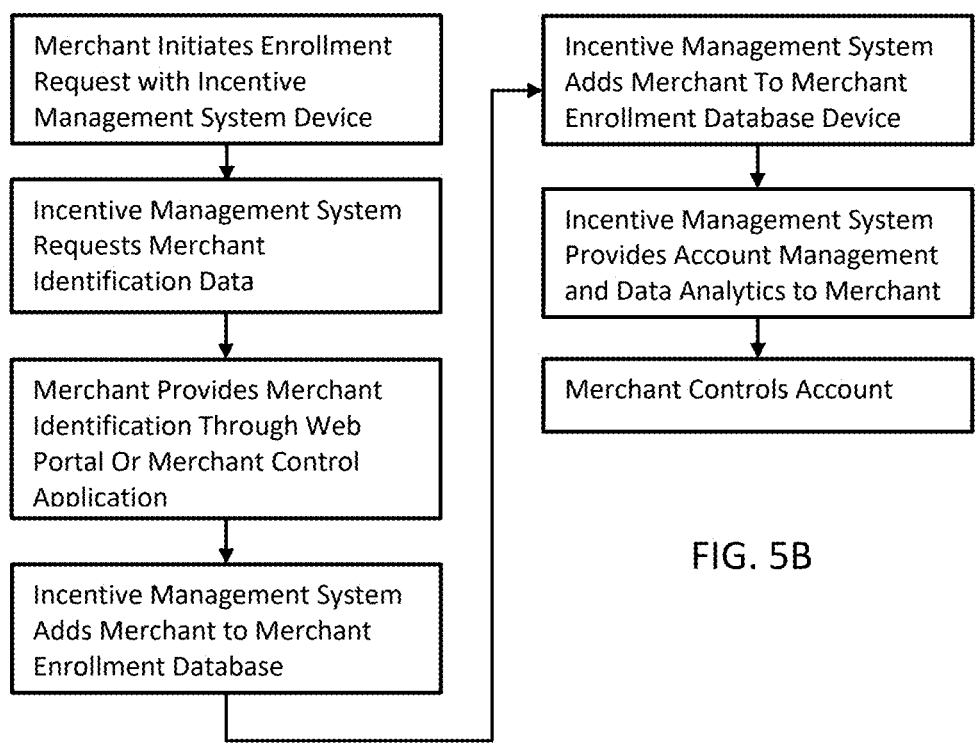
FIG. 5B is a flow chart showing steps of a method of enrolling a merchant such that the merchant can provide rewards and receive rewards payments.

Referring now specifically to FIGS. 5A-5B, the process of enrolling a merchant is shown in more detail and according to one embodiment. FIG. 5A shows a schematic of the data flow between a merchant non-point of sale device and the incentive management system 106 in the context of enrolling the merchant. FIG. 5B shows a flowchart illustrates the steps taken to enroll the merchant.

Figure 6A:
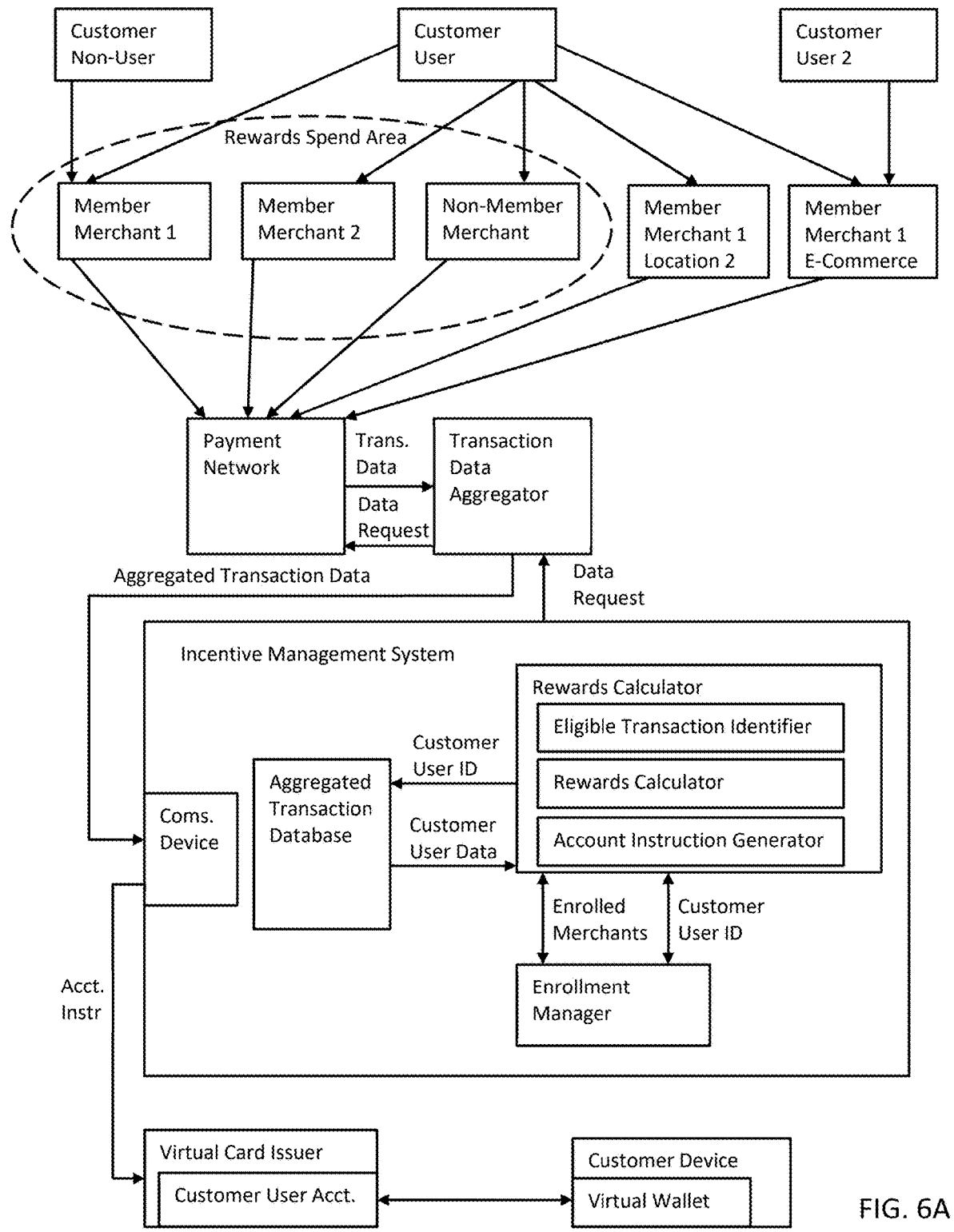
FIG. 6A is a simplified block diagram showing the relationship between systems and devices within and related to the transaction incentivizing system as pertains to customers earning rewards.
Figure 6B:
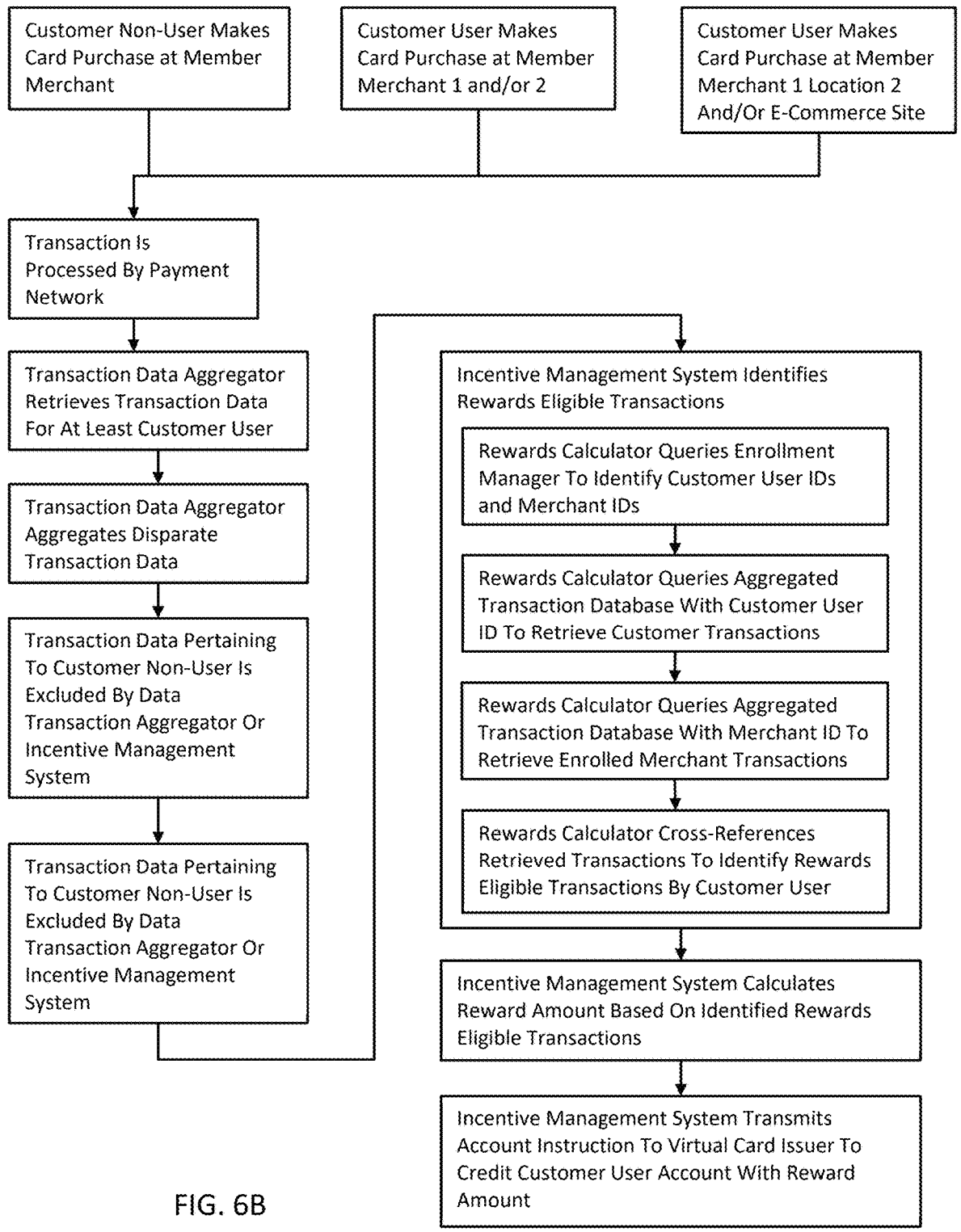
FIG. 6B is a flow chart showing steps of a method of generating rewards for customer purchases.

Referring now specifically to FIGS. 6A-6B, the process of identifying rewards eligible transactions, calculating rewards, and applying rewards to a virtual payment card account is shown in more detail and according to one embodiment. FIG. 6A shows a schematic of the data flow between a payment cardholder, merchant, payment network 102, transaction data aggregator 104, incentive management system 106, virtual card issuer 108, and enrolled payment cardholder device 118 in the context of enrolling the merchant. FIG. 6B shows a flowchart illustrates the steps taken to identify rewards eligible transaction, calculate rewards, and apply rewards to a virtual payment card account of an enrolled payment cardholder.

Figure 7A:
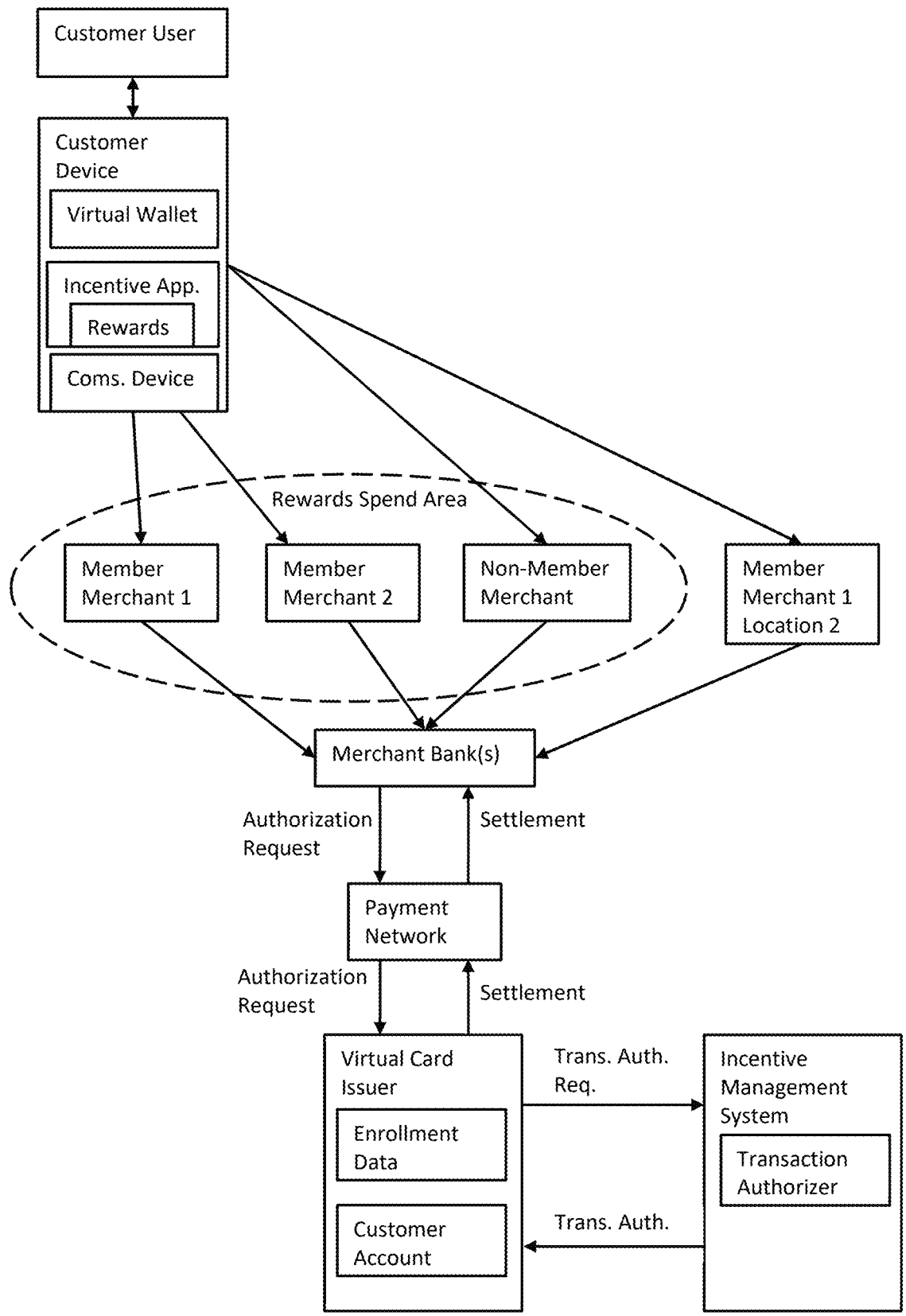
FIG. 7A is a simplified block diagram showing the relationship between system and devices within and related to the transaction incentivizing system as pertains to customers redeeming rewards.
Figure 7B:
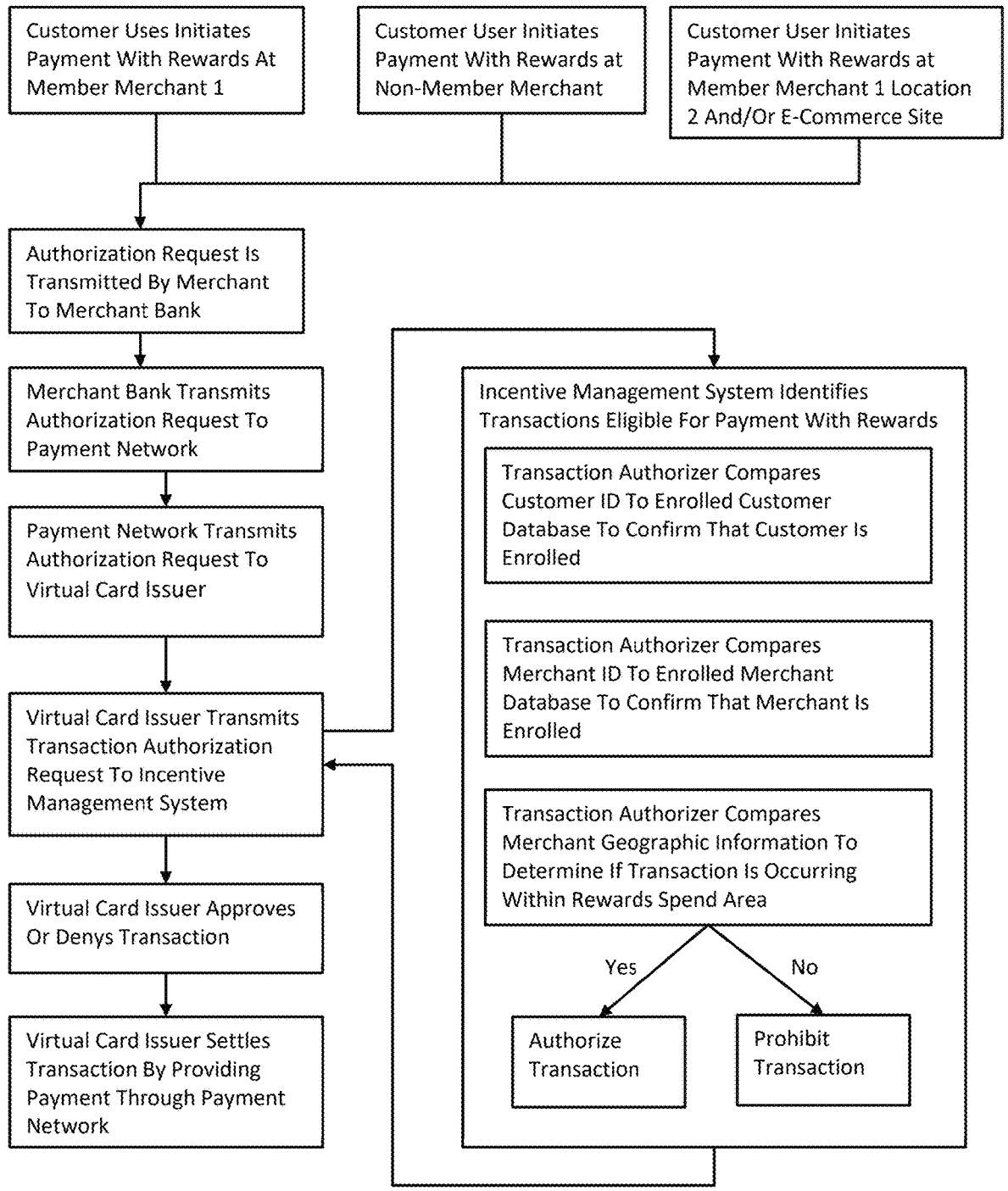
FIG. 7B is a flow chart showing steps of a method of customer redemption of earned rewards.

Referring now specifically to FIGS. 7A-7B, the process of authorizing the spending of rewards by a virtual payment card held by an enrolled payment cardholder is shown in more detail and according to one embodiment. FIG. 7A shows a schematic of the data flow between a payment cardholder's virtual wallet, merchant, payment network 102, virtual card issuer 108, and incentive management system 106 in the context of authorizing the spending of rewards using the virtual payment card and spending those rewards. FIG. 7B shows a flowchart illustrates the steps taken to process an adultization request for spending rewards using a virtual payment card and the spending of such rewards.

Referring now generally to FIGS. 1-7B, the process described herein is described in relation to a single payment card held by an enrolled payment cardholder. Purchases made with the single payment card being capable of earning rewards so long as the other conditions described herein are met. This description is made relative to a single payment card for simplicity. It should be understood that the same processes, methods, systems, equipment, etc. can be used with respect to a plurality of payment cards held by an enrolled payment cardholder. In such cases, identification information should be read to include such information for each payment card. To facilitate functioning of the system 100, the incentive management system 106 can, upon enrollment, generate a new enrolled payment cardholder master identification (e.g., master identification number). This number is attached to database entries that include cardholder identification information associated with the enrolled payment cardholder. Thus, the master identification is generated and associated with cardholder identification data stored in the enrolled payment cardholder database and associated with transactions including any of the payment cards held by the single enrolled payment cardholder. The master identification is also transmitted to the virtual card issuer 108 along with instructions to apply earned rewards such that rewards earned from purchases on multiple different payment cards are applied to the account of the common payment cardholder who has used their different payment cards. The master identification can be the account number associated with the virtual payment card issued by the virtual payment card issuer 108.

In an alternative embodiment, the same process is preformed but is instead driven by the virtual card issuer 108. When a payment cardholder is enrolled, the virtual card issuer 108 establishes (e.g., issues) a virtual card and creates an account. That account number is transmitted to the incentive management system 106 which then uses it as the master identification as just described in order to track rewards earned by a single enrolled payment cardholder through the use of multiple of their payment cards. Each payment card is separately added through the application on enrolled payment cardholder's device 118 and associated with the master identification by the incentive management system 106.

Likewise, identification data for merchants can encompass a single merchant's multiple locations and/or E-commerce website/application. This can be done with multiple entries and/or a master identification similar to the type previously described. This allows, for example, purchases at multiple locations and/or online purchases by an enrolled payment cardholder to earn rewards. Individual transactions can still be authorized based on the specific location of the merchant (regardless of the merchant having multiple locations) in order to geographically restrict the redemption of rewards consistent with such description herein. Therefore, the database of enrolled merchant identification data can include merchant identification data for a single merchant corresponding to both a physical location and an internet accessible purchase portal, such that the incentive management system 106 is adapted and configured to generate rewards for transactions conducted with an enrolled merchant for both physical location sales and internet sales. For a single enrolled merchant, the database of enrolled merchant identification data can include a first datum corresponding to the enrolled merchant's online storefront and includes a second datum corresponding to the enrolled merchant's physical storefront.

Still referring generally to FIGS. 1-7B, in some embodiments, the system 100 is capable of acquiring historical transaction data. This historical transaction data can be used to generate rewards but in the preferred embodiment is not. In the preferred embodiments of the system 100, the historical transaction data is used to predict future enrolled payment cardholder purchases, match the enrolled payment cardholder with new merchants or brands of potential interest based on past purchases and/or other data (e.g., recommend purchases), present offers to the enrolled payment cardholder, calculate a customer lifetime value of the enrolled payment cardholder, or perform other analytic processes. The system 100 provides an advantage in that it can acquire historical transaction data for these analytical processes. The system 100 also has an advantage in that the earning of rewards drives further transactions which can then be captured and used as inputs to these analytical processes. The system 100 also capture data that is typically not available from individual merchants due to their unwillingness or inability to collect or share such data. By acquiring transaction data (historic and/or prospective), the system is able to perform analytics of value to a shopping mall lessor, merchant, or other parties. The analytic processes capable of being performed thanks to the data collection provided by the system 100 are described in greater detail later herein.

As regards to acquiring historical transaction data, the incentive management system 106 can, in response to enrolling a payment cardholder, transmit a data request from the incentive management system to the transaction data aggregator 104 seeking transaction data associated with the enrolled payment cardholder, the data request seeking historical transaction data. The request includes at least cardholder identification information (e.g., a payment card number). The incentive management system 106 receives, from the transaction data aggregator 104, historical transaction data corresponding to transactions occurring before the payment cardholder was enrolled and to which the payment cardholder was a party. The historical transactions data can correspond to a time period of between one and three years prior to a date on which the payment cardholder is enrolled. The time period can also be up to two years prior to a date on which the payment cardholder is enrolled. The two-year period is particularly advantageous in that it has been found to encompass enough transactions information over a long enough period for meaningful use in analytic processes described herein while simultaneously remaining a reliable reflection of the enrolled payment cardholder's historical activity.

Turning now to analytical processes that can be performed as a result of the data collection provided for by the system 100, FIGS. 8A-8C illustrate interconnected portions of a relational data model that portrays the data points that are captured through the system 100 (including inputs through the application running on the enrolled cardholder device 118) as well as the relationship between different data points. The system 100 has an advantage in the variety, scale, and types of data that are collected for use in predicting further enrolled cardholder purchases and activities as well as for use in providing recommendations to enrolled cardholders. Generally speaking, the system 100 captures information about enrolled cardholder demographics, enrolled cardholder brand interests, enrolled cardholder behavior, and enrolled cardholder transactions. This information data set is used for a variety of analytical processes described herein— e.g., to predict further behavior of enrolled payment cardholders, to predict and calculate a customer lifetime value associated with the enrolled payment cardholder (e.g., value to a specific brand, value to the geographic location, etc.), to recommend products and brands to the enrolled payment cardholder, or the like.

Figure 8:
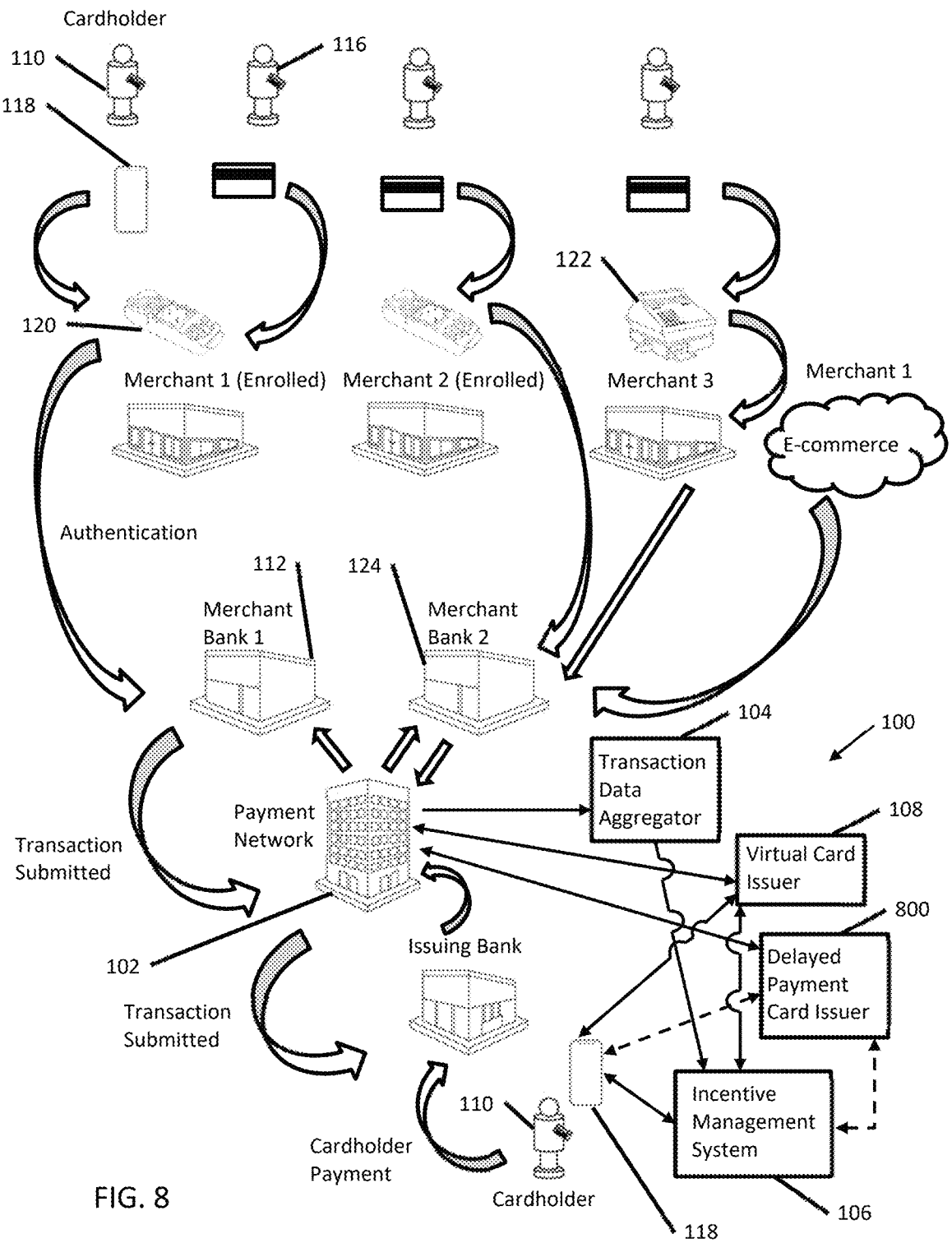
FIG. 8 is a schematic diagram illustrating the relationship between a multi-party payment card system and systems that enable the incentivizing of repeat transactions with merchants within a prescribed geographic area using payment processing network data and provide for delayed payments by a cardholder.
Figure 9:
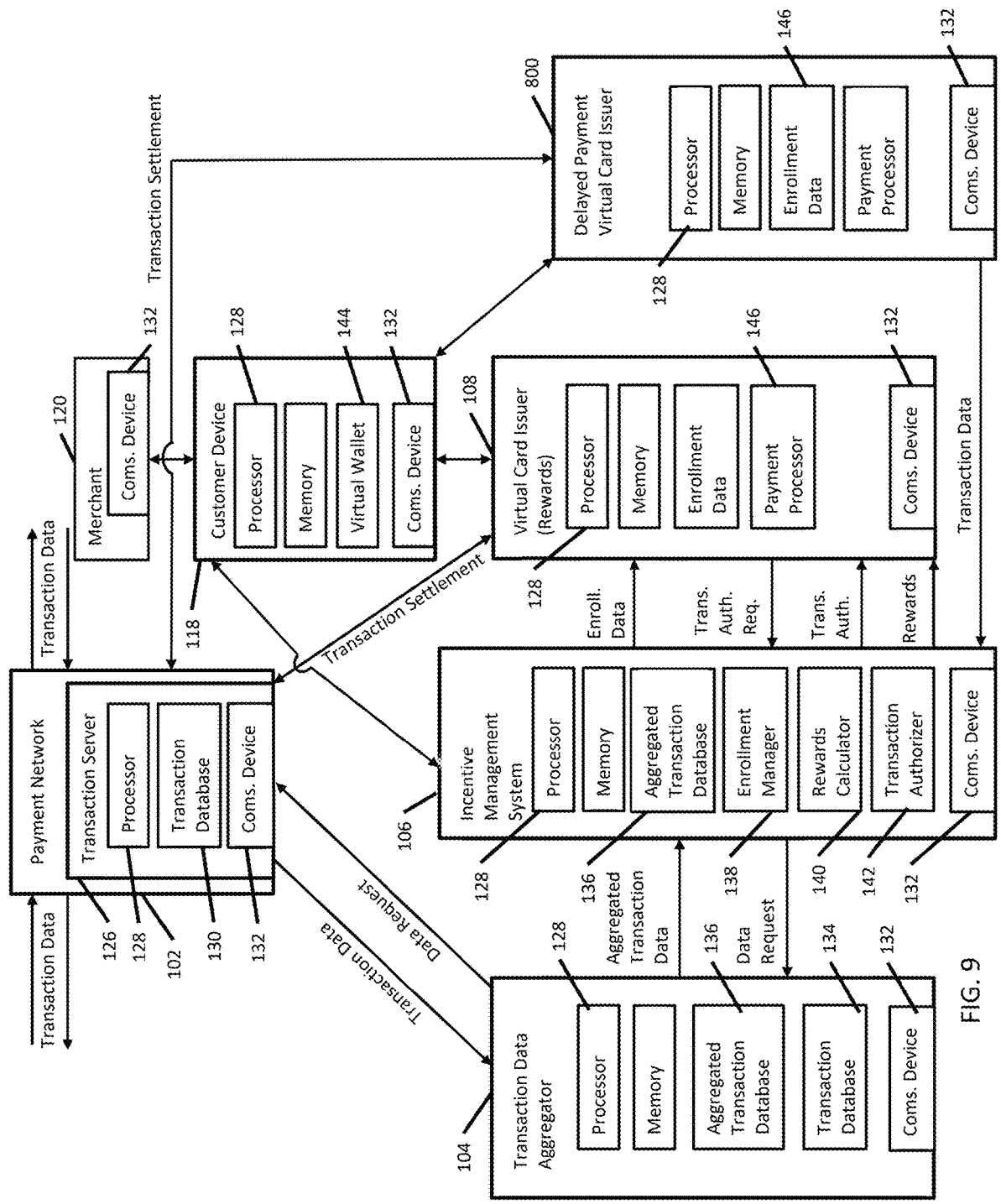
FIG. 9 is a simplified block diagram illustrating the relationship between the multi-party payment system network, a transaction data aggregator, incentive management system, virtual card issuer, delayed virtual payment card issuer, customer device, and merchant that enable the incentivizing of repeat transactions by customers at specific merchants and providing of delayed customer payments.

Referring generally to FIGS. 8A-8C and specifically to FIG. 9 (a simplified data model), the system 100 collects cardholder demographics through the enrollment process and using the application running on the enrolled cardholder's device 118. The system 100 collects enrolled cardholder brand interests through the application running on the enrolled cardholder's device 118. The system 100 collects enrolled cardholder behavior data through cardholder interaction with prompts provided by the application running on the enrolled cardholder's device 118. The system 100 collects enrolled cardholder transactions using the processes previously described herein which facilitate the identification of rewards eligible transactions (e.g., using the transaction data aggregator 104 to gather transactions made by enrolled payment cardholders).

Discussing enrolled cardholder demographics specifically, this data set for use in the analytical processes described herein includes information such as name, e-mail address, address, birthdate, gender, sex, race, height, weight, shoe size, age, marital status, annual income, level of educational attainment, or like information. This information is collected by the system 100 by requesting the information using instructions (digital messages having executable program instructions) sent to the application running on the enrolled payment cardholder's device 118 (e.g., the application that at least in part allows the enrolled payment cardholder to view rewards balances and facilitate rewards spend transactions). The demographic information can be requested during enrollment of the payment cardholder by employing fillable fields, questionnaires, multiple choice selections, and the like. In order to improve data collection, the input requests seeking this information can be voluntary and coupled with an offer for rewards to be applied to the enrolled cardholder's account or other traditional promotional items (e.g., coupons). Further to increase participation in the collection of demographic data, the requests for such data can be spread over time using periodic prompts for data communicated to the enrolled payment cardholder by the application. Again, such requests prompted by the application can be coupled with enticements. In some embodiments, some data requests presented by the application are not optional. For example, requests for name, birthday, address, etc. can be made conditional with enrollment; the requests being made at the time of enrollment.

Discussing enrolled cardholder brand interests specifically, this data set for use in the analytical processes described herein includes information such as enrolled payment cardholder self-reported interest in specific brands, merchants, products, product categories, or the like. This data, like with the demographic data, is collected using the application running on the enrolled cardholder's device and can be collected at enrollment, over time, and/or with or without incentives. The data can be collected using surveys, tagging of brands/categories in which the enrolled payment cardholder is interested, a ranked choice of brands offering products in similar categories (e.g., ranked preference of merchant's selling shoes), designating favorited brands, designated brands for which the enrolled payment cardholder wishes to receive special offers, or the like.

Discussing enrolled cardholder behavior specifically, this data set for use in the analytical processes described herein includes information that is gathered using the application running on the enrolled payment cardholder's device and includes interactions with information presented by the application itself and information provided the application corresponding to the enrolled payment cardholder's behavior in the physical world. Information presented on the application itself and the enrolled payment cardholder's interactions with the application itself include such data as interaction with targeted ads served by the application, browsing history through the application (e.g., brand pages viewed, number of clicks on each brand page/subpage, time on page, etc.), recency of use, frequency of use, recency of viewing a particular brand, frequency of viewing a particular brand, redemption of offers/coupons presented by the application, which push notifications are viewed, and the like. Information provided by the application corresponding to the enrolled payment cardholder's behavior in the physical world includes such information as geolocation data from the application indicating presence at various retailers within the geographic boundary (e.g., which merchants visited and for how long), check-in data corresponding to quick-reference codes scanned within the geographic boundary (e.g., the codes associated with particular merchants, particular offers, etc.), scanning of barcodes corresponding to specific products for sale for additional information on the product, and the like.

Discussing enrolled cardholder transaction data specifically, this data set for use in the analytical processes described herein includes information that is gather using the system 100 (e.g., the transaction data aggregator 104 and the incentive management system 106) and the application running on the enrolled payment cardholder's device. Transaction information includes historical transaction data (e.g., two years of historical transaction data reflecting transactions made by the enrolled payment cardholder) including associated transaction information such as transaction amount, date, merchant, channel (physical store or online purchase), transaction merchant category (e.g., retail, pharmacy, grocery, etc.). The transaction data is further broken down by and includes prospective transactions that occur in real time. This transaction data is added to the data set as the transactions occur. The transaction data also breaks out transactions that are made involving redemption of rewards through the system 100. All transaction information includes the transaction information described here and elsewhere herein. In some embodiments, redemption of rewards can be coupled with a request presented to the enrolled payment cardholder using the application for additional data about the rewards transaction. For example, the application can ask the enrolled payment cardholder to identify the product purchased (e.g., manually, by scanning a barcode, by confirming a predicted product predicted by the incentive management system based on transaction amount, etc.). Advantageously, this provides more granular data when product information is not otherwise available (e.g., if the transaction information does not include stock keeping unit information). In some embodiments, the transaction data can include stock keeping unit information.

All of the data pertaining to information about enrolled cardholder demographics, enrolled cardholder brand interests, enrolled cardholder behavior, and enrolled cardholder transactions is collected and assigned to enrolled payment cardholders as attributes. The attributes can be binary (e.g., Boolean) or on a scale. These attributes are used by the incentive management system 106 to recommend merchants for customers (e.g., enrolled payment cardholders) to shop with, to provide customers with targeted advertising/deals/promotions, predict and calculate a customer lifetime value (to the brand, to the geographic location, to a prospective brand considering opening a store within the geographic location), etc. The attributes for each enrolled cardholder are stored in a database that may also include transaction information associated with the particular enrolled payment cardholder. One embodiment of such a database is described in greater detail later herein with respect to FIG. 11.

In order to perform these functions (e.g., analytical processes), a variety of techniques can be used. In some embodiments, all enrolled payment cardholders are placed into cohorts with like enrolled payment cardholders based on overlaps with the attributes between the enrolled payment cardholders. Cardholders can be placed in multiple cohorts. The cohorts can be established by machine learning, neural networks, seeded manually and iterated, collaborative filtering, or the like. Using the established cohorts, behaviors can be predicted, recommendations made, customer lifetime value calculated, etc. based on the actions some in the cohort have taken (e.g., purchase) that others in the same cohort have not (e.g., they are predicted to take the same or a similar action/purchase by being in the same cohort in which the enrolled payment cardholders share substantial attributes).

In one embodiment, the analytical processes (specifically matching and recommending) are conducted using collaborative filtering with or without machine learning. Collaborative filtering being the technique known by those of skill in the art as the process of filtering for information or patterns using techniques involving collaboration among multiple agents, viewpoints, data sources, etc. The collaborative filtering used can be memory-based, model based, a hybrid memory-model based collaborative filtering, deep-learning based, or the like. In some embodiments, an objective function for the collaborative filtering can a customer lifetime value such that the analytical process predicts and cohorts enrolled payment cardholders based on customer lifetime value. Customer lifetime value is a calculation known to those skilled in the art of the total value to a business of a customer over the whole period of their relationship and is based at least in part on the recency of purchases, frequency of purchases, and value of purchases. The calculation of customer lifetime value is known to those skilled in the art.

The system 100 provides a significant advantage primarily in that it collects more data and data of types that is not otherwise available (e.g., in a shopping center context). This data can be used by the collaborative filtering analytical technique and/or customer lifetime value calculation technique to achieve more accurate outcomes to the improved quality and amount of data. Further the rewards-based ecosystem encourages further participation by enrolled payment cardholders such that data is continuously generated further improving the analytical processes. Thus, customer recommendations, predictions of customer behavior, calculations of customer lifetime value, and the like are improved in their accuracy and usefulness as well as are made possible in the context of a geographically prescribed area (e.g., a shopping center lessor) where the data would otherwise not be available (e.g., due to a lack of information sharing or lack of information generation).

Referring now to FIG. 8, in some embodiments, the system 100 further includes a delayed payment card issuer that enables a cardholder 110 user to make purchases and delay payments for the purchases. The system 100 shown in FIG. 8 operates in the same manner previously described with reference to FIG. 2 with the additional equipment, features, operations, and functions discussed in the foregoing.

The system 100 includes a delayed payment card issuer 800 which interfaces with the payment network 102 in order to provide for transaction settlement between delayed payment card issuer 800 and merchant banks 112, 124 for purchases made by a cardholder (e.g., cardholder 110) who has enrolled with the delayed payment card issuer 800 for the purposes of making delayed payments for a purchase. The delayed payment card issuer 800 settles the full amount of the transaction with the merchant bank in the normal course of operation of the payment network 102 (e.g., with settlement occurring within 1 day or another standard timeframe). The cardholder 110 enrolled with the delayed payment card issuer 800 can then pay the delayed payment card issuer 800 overtime for the amount of the transaction settled by the delayed payment card issuer 800. For example, the cardholder 110 can settle with the delayed payment card issuer 800 in a series of payments over time (e.g., one payment a month for four months). These settlement payments from the cardholder 110 to the delayed payment card issuer 800 can be setup to occur automatically from the cardholder 110's payment card account associated with the information provided to the delayed payment card issuer 800. This allows for the delayed payment card issuer 800 to function similarly to a buy now pay later service provider.

In order to facilitate this function, the delayed payment card issuer 800 issues a virtual payment card to an enrolled cardholder (e.g., cardholder 110). This is done in response to a request from the enrolled cardholder 110/user. The request from the enrolled cardholder 110 is received by the application running on the user device 118 and includes identification information, payment information, and loan information (e.g., the loan information identifying the amount and/or thing(s) being purchased under the buy now pay later service). The user device 118 provides this information to the delayed payment card issuer 800 directly or indirectly using one or more application programing interfaces (APIs).

The delayed payment card issuer 800 enrolls the cardholder 110/user (already enrolled with the incentive management system) if the cardholder 110/user has not already been enrolled with the delayed payment card issuer 800. This can include the delayed payment card issuer 800 processing the request to determine whether to approve the cardholder 110/user. For example, the delayed payment card issuer 800 can run a credit check on the cardholder 110/user based on identification information (e.g., the user's name, address, etc.), examine any prior history with the delayed payment card issuer 800 (e.g., prior accounts, prior payback history, etc.), bank account balance associated with the payment card information submitted for automated repayment, transaction history associated with the payment card information submitted for automated repayment, etc. The delayed payment card issuer 800 can also factor in the cost of the purchase or amount of loan sought by the cardholder 100. If the buy now pay later (e.g., short term loan) request is denied, the delayed payment card issuer 800 sends an instruction to the cardholder 110 device 118 and to the application running thereon using an API to cause the application to inform the cardholder (e.g., by displaying a push notification, message, etc.) that the request has been denied. If the buy now pay later (e.g., short term loan) request is approved, the delayed payment card issuer 800 enrolls the cardholder 110/user (in some embodiments, the cardholder 110 is enrolled regardless of approval status and if approval is denied, no virtual card is created or no funds or provided for an issued virtual card). The delayed payment card issuer 800 enrolls the cardholder 110 by creating a database entry including identification information and issuing a virtual payment card and adding virtual payment card information to the database entry (e.g., account number, security information, balance, etc.). The delayed payment card issuer 800 communicates enrollment to the cardholder 110 using a message to the user device 118 and API which causes the application on the user device 118 to display a message indicating that they have been approved. The communication to the user device 118 further includes instructions that cause the application and user device 118 to add the issued virtual payment card to a virtual wallet on the user device 118. The communication from the delayed payment card issuer 800 includes information associated with the virtual payment card that allows for adding the virtual payment card to the virtual wallet. For example, such information includes a virtual payment card number, virtual payment card security code, virtual payment card expiration date, etc.

Upon enrolling a cardholder 110/user, the delayed payment card issuer 800 coordinates with the incentive management system 106. This coordination allows for the cardholder 110/user of the delayed payment virtual payment card to earn rewards on purchases made using the buy now pay later services facilitated by the delayed payment card issuer 800. The delayed payment card issuer 800, upon enrollment of the cardholder 110/user, communicates (e.g., using a message containing relevant information, API, and internet connection) directly to the incentive management system the information used in tracking the earning of rewards as previously explained herein. For example, the message from the delayed payment card issuer 800 to the incentive management system 106 includes identification information and virtual payment card information. The identification information includes the identification information provided by the user device 118 to the delayed payment card issuer and previously assigned by the incentive management system 106 (e.g., a user identification number, name, address, physical payment card information, bank account number, or the like). This allows for the incentive management system 106 to cross reference the data received from the delayed payment card issuer 800 with database information stored for already enrolled cardholders 110 (e.g., using the common identification number first assigned by the incentive management system 106 when onboarding the cardholder 110). The virtual payment card information provided by the delayed payment card issuer includes virtual payment card number, expiration date, security code, and/or other information identifying the virtual payment card and/or any associated banking account. The incentive management system 106 stores the virtual payment card information in the same manner in which it stores payment card information for the purposes of tracking and earning rewards as previously explained herein (e.g., monitoring transaction activity involving the virtual payment card issued by the delayed payment card issuer 800, i.e., second virtual payment card, for transactions that qualify to earn rewards and applying rewards based on the amount of identified qualified transactions to the balance on the rewards, i.e., first, virtual payment card).

Alternatively, the delayed payment card issuer 800 communicates historical transaction data for enrolled cardholders 110/users directly to the incentive management system. The message to the inventive management system 106 (e.g., via an API and internet connection) includes an identification of the cardholder 110/user (e.g., the user's identification number assigned by the incentive management system 106 during enrollment and communicated by the companion application on the user device 118 to the delayed payment card issuer 800) and transaction data for transactions involving the second virtual payment card (i.e., the buy now pay alter virtual payment card issued by the delayed payment card issuer 800). In this embodiment, the transaction data can include, for each transaction carried out with the delayed payment virtual payment card (i.e., second virtual card), transaction data including transaction amount, date, merchant (e.g., name, identification number, etc.), channel (physical store or online purchase), transaction merchant category (e.g., retail, pharmacy, grocery, etc.), or other transaction of the type previously disclosed used to determine if a transaction qualifies for earning rewards (also as previously discussed). The incentive management system 106 can use the transaction data associated with the buy now pay later virtual card (i.e., second virtual payment card) and received from the delayed payment virtual card issuer 800 to provide the enrolled cardholder 110/user with rewards on their virtual payment card (i.e., first virtual payment card) for qualifying transactions. The transaction data for purchases made with the second virtual payment card (issued by the delayed payment virtual card issuer 800) are analyzed and rewards are applied on the first virtual payment card (issued by the virtual card issuer 108) in a manner similar to that as previously described with respect to transaction data from a physical payment card enrolled with the incentive management system 106.

In the embodiments just described, the delayed payment card issuer 800 and the incentive management system 106 communicate directly. In alternative embodiments, the delayed payment card issuer 800 does not communicate directly with the incentive management system 106. Rather, the delayed payment card issuer 800 communicates with the user device 118 and application running thereon in place of the incentive management system 106. The application and user device 118 communicates with the incentive management system 106 and functions as an intermediary between the delayed payment card issuer 800 and the incentive management system 106.

Upon receiving a request from the user device 118 for use of the buy now pay later services and if the cardholder 110/user is already enrolled with the delayed payment card issuer 800, then the delayed payment card issuer 800 can either add balance to an existing delayed payment virtual payment card assigned to the cardholder 110/user or assign a new delayed payment virtual payment card to the cardholder 110/user (the delayed payment card issuer 800 can make a determination to approve or deny the request using any suitable technique such as those described above with respect to enrolling new cardholders 110/users). If a new delayed payment virtual payment card is issued for a new buy now pay later request, the delayed payment card issuer 800 communicates the virtual payment card information to the application and user device 118 (e.g., using an API and message including identification information such as user identification number used by the incentive management system 106, user name, user payment card number, user account number, user bank account number, etc.; virtual payment card information such as virtual payment card number, security code, account number, etc.; and approved loan information such as an amount the cardholder 110 is approved to spend and pay back with delayed payments). The communication from the delayed payment card issuer 800 to the user device 118 includes (e.g., in the message) instructions to the application running on the user device 118 to cause the virtual payment card issued by the delayed payment card issuer 800 to be added to the virtual wallet on the user device 118.

After the delayed payment virtual payment card (e.g., a second virtual payment card, the first being the virtual payment card issued by the virtual card issuer 108 and the incentive management system 106 for storing and spending earned rewards) is issued and the second virtual payment card is stored in the virtual wallet of the enrolled payment cardholder device 118, the cardholder 110/user can present the second virtual payment card to complete purchases using the buy now pay later service provided by the delayed payment card issuer 800. The virtual payment card information of the second virtual payment card is submitted through a merchant point of service in an attempt to complete the transaction. The authorization request, through the payment network 102, is presented to the delayed payment card issuer 800 which then determines whether are not to authorize the transaction. The delayed payment card issuer 800 can make this determination based on the information in the transaction authorization request and the information stored in a database of the delayed payment card issuer 800 and pertaining to the short term loan for which the cardholder 110/user was authorized and for which the second virtual card was issued by the delayed payment card issuer 800. For example, the delayed payment card issuer 800 can determine if the merchant identification information, transaction amount, merchant location, and/or other information between the transaction authorization request and the database of approved request match or are within acceptable bounds. If the transaction is authorized, the delayed payment card issuer 800 communicates the authorization to the merchant point of sale through the payment network 102 and the transaction proceeds. If the transaction is not authorized, this is communicated in the same manner and the transaction does not proceed. Once authorized, the transaction proceeds. The cardholder 110/user receives the product or service. The transaction settles between the merchant bank (e.g., merchant bank 1, 112) and the delayed payment card issuer 800 using the payment network 102 and typical transaction settlement procedures (e.g., of the type previously described herein). The delayed payment card issuer 800 collects periodic payments from the cardholder 110/user to recoup the amount of the purchase thereby completing the buy now pay later arrangement. In alternative embodiments, transaction authorization for the second virtual payment card is handled by the incentive management system 106 in the same manner as described with transaction authorization for the first virtual payment card (e.g., for spending earned rewards) and using the same criteria previously explained with respect to the delayed payment card issuer 800. In such embodiments, the incentive management system 106 can optionally handle the enrollment of cardholders 110/users previously described as being handled by the delayed payment card issuer 800. In other words, the incentive management system 106 in such cases performs all functions of the delayed payment card issuer 800 other than the issuing of the virtual card and settling of transactions. In such cases, the delayed payment card issuer 800 does issue the second virtual card and settle transactions but only to carry out instructions from the incentive management system 106 (e.g., with the incentive management system 106 processing buy now pay later requests, authorizing transactions, and/or receiving payments from cardholders 110/users for the amount of the buy now pay later transaction).

Rewards are eligible to be earned by the cardholder 110/user on purchases made using the buy now pay later service of the delayed payment card issuer 800 (i.e., using the second virtual payment card). As previously explained, the rewards, if any, earned by the cardholder 110/user are determined by the incentive management system 106 based on transaction data for transactions carried out using the second virtual payment card (i.e., the delayed payment virtual card issued by the delayed payment card issuer 800). The transaction data is analyzed and rewards are applied the same way as for transactions completed with the enrolled physical payment card of the cardholder 110/user. The transaction data for the second virtual payment card is received by the incentive management system 106 using a suitable technique. In one embodiment, the transaction data is received from the transaction data aggregator 104 and based on identifying information of the second virtual payment card (e.g., payment card number, security code, expiration date, etc.) and provided to the transaction data aggregator 104 by the incentive management system 106. The virtual payment card information is in turn provided to the incentive management system 106 by the delayed payment card issuer 800 as part of the enrollment process. Alternatively, the transaction history for the second virtual payment card is provided to the incentive management system 106 by the delayed payment card issuer 800.

Referring now to FIGS. 8 and 9, the operation of the system 100 is described in greater detail with respect to the delayed virtual payment card issuer 800. In one embodiment, the cardholder 110 interacts with their customer device 118 and the application running thereon to request a delayed payment arrangement to purchase a product or service (e.g., a buy now pay later request). The application includes a graphical user interface element that a user interacts with to begin the request process. The application requests information from the user including identification information (e.g., name, phone number, address, date of birth, etc.), payment information for delayed payment of the purchase price of the product/service bought (e.g., payment card information such as number, security code, expiration, etc.), and/or credit rating information (e.g., bank account identifying information and permission to access credit history, etc.). The request can also include delayed payment details such as an amount requested for a purchase, the identification of a product or service to be purchased, the identification of a merchant from whom to purchase, and/or other information. The collected information (e.g., collected by drop downs, fields, or other graphical user interface elements) are stored in memory of the customer device 118. The graphical user interface and the application being executed by instructions in memory and the processor 128 of the customer device 118 (i.e., user device 118).

The application of the user device 118 communicates the request information to the delayed payment card issuer 800 using the communications device 132 of the customer device and the communications device 132 of the delayed payment virtual card issuer 800. For example, the customer device 118 (using the communications device 132) transmits a message through an internet connection to the delayed payment virtual card issuer 800 that contains the request information formatted to be handled by an API of the virtual card issuer 800. The message can include delineated information of the type described as request information. The message also includes information identifying the user of the application on the customer device 118. For example, this includes an identification number or other identification information assigned by the incentive management system 106 and store by the application in the memory of the customer device 118.

In an alternative embodiment, the application on the customer device 118 includes a graphical user interface element for requesting a buy now pay later service. Upon selection of the graphical user interface element (e.g., a button, hyperlink, or the like), the application causes an internet browser or second application associated with the delayed payment virtual card issuer 800 to launch and allow for the user to provide the request information directly to the delayed payment virtual card issuer 800. This can include providing cardholder 110 identification information to the delayed payment virtual card issuer 800. For example, the hyperlink can be unique to the instance of the application on the user device and thus provide the identification number assigned by the incentive management system 106. Likewise, when the application provides an instruction to launch the second application, the instruction can include the cardholder 110 identification number assigned by the incentive management system 106. This or another suitable technique allows for the request information to be submitted directly to the delayed payment virtual card issuer 800 and be associated with the cardholder identification information stored by the incentive management system 106 such that the cardholder 110 can earn rewards on purchases made by the second virtual payment card issued by the delayed payment virtual card issuer 800.

In still further alternative embodiments, the cardholder 110 can interface with the delayed payment virtual card issuer 800 separate from the application running on the customer device 118. For example, the cardholder 110 can provide request information for participation in the buy now pay later service exclusively through a web browser interfacing with the delayed payment virtual card issuer 800 or through a separate second application interfacing with the delayed payment virtual card issuer 800. In such cases, the delayed payment virtual card issuer 800 can indicate that for the cardholder 110 to participate in the rewards program administered by the incentive management system 106 such that purchases made by the buy now pay later virtual card, the cardholder 110 must provide identification information assigned by the incentive management system 106. This allows the delayed payment virtual card issuer 800 to provide virtual payment card information for the second virtual payment card to the incentive management system 106 associated with identification information for a cardholder 110/user previously enrolled with the incentive management system 106. In turn, this allows the incentive management system 106 to provide rewards to the cardholder 110/user for transactions conducted with the second virtual payment card used in buy now pay later purchases.

The delayed payment virtual card issuer 800 receives the request information and associated identification of the cardholder 110 using any of the suitable techniques described above. In response to receiving the request information, the delayed payment virtual card issuer stores and processes the request information using the processor 128 and memory of the delayed payment virtual card issuer 800. The delayed payment virtual card issuer 800 enrolls the cardholder 110 upon approval of the request if the cardholder 110 is not already enrolled. Enrolling the cardholder includes creating a database entry in a database of enrolled card holders 110 in memory of the delayed payment virtual card issuer 800. The database includes identification information of the cardholder 110 including identification information that allows for cross reference between databases of cardholders 110 enrolled with the incentive management system 106 and enrolled with the delayed payment virtual card issuer 800. For example, the identification information stored in the database of enrolled cardholders 110 of the delayed payment virtual card issuer 800 includes an identification/account number assigned by the incentive management system 106 (e.g., a payment card number submitted during enrollment with the incentive management system 106 or other number), cardholder 110 name, address, or other identification information unique alone or in combination with other identification information to the cardholder 110 previously enrolled with the incentive management system 106.

In some embodiments, cardholders 110 who are already separately enrolled with the incentive management system 106 and the delayed payment virtual card issuer 800 can link their accounts/enrollment. For example, the application running on the customer device 118 can include a user interface element that allows a user to transmit identification information to the delayed payment virtual card issuer 800 to link their account. The application causes the user device 118 to transmit to the delayed payment virtual card issuer 800 identification information (e.g., an account identification number assigned by the incentive management system 106). The identification information can be stored in memory locally by the application or retrieved from the incentive management system 106 and transmitted. Alternatively, the application running on the user device can include a user interface element (e.g., a field or fields) for a user to input information to link an existing account with the delayed payment virtual card issuer 800 to an existing account with the incentive management system 106. For example, a user enters identification information such as an account name or identification number and associated password, virtual payment card information (e.g., card number, expiration date, security code, etc.), or the like corresponding to an account with delayed payment virtual card issuer 800 into the fields of the application. The application then causes the user device 118 to transmit a message to the incentive management system 106 identifying the user (e.g., using identification information such as an account number previously assigned by the incentive management system 106 during enrollment) and including the identification information entered by the user and associated with the delayed payment virtual card issuer 800. The identification information associated with the delayed payment virtual card issuer 800 is then stored in the database of enrolled users maintained by the incentive management system 106 and associated with the individual user identified in the message. The incentive management system 106 can then use this information to track buy now pay later purchases for earning rewards using the transaction data aggregator 104 as previously explained. Alternatively, in some embodiments, the incentive management system 106 and the delayed payment virtual card issuer 800 communicate with one another to cross enroll users. For example, once the incentive management system 106 receives the identification information from a user device 118 corresponding to the delayed payment virtual card issuer 800, the incentive management system 106 transmits this information and identification information corresponding to the user's account with the incentive management system 106 along with a request in a message to the delayed payment virtual card issuer 800. The request portion of the message is formatted (e.g., according to an API) to cause the delayed payment virtual card issuer 800 to associate identification information associated with the incentive management system 1076 account with its own database of enrolled users based on that portion of the information received in the message (i.e., the identification information associated with eh delayed payment virtual card issuer 800 received by the incentive management system 106 from the user device 118 and then transmitted to the delayed payment virtual card issuer 800). The delayed payment virtual card issuer 800 can then periodically transmit transaction data for the now cross enrolled cardholder 110/user to the incentive management system 106 identified with the incentive management system's 106 identification information (retrieved from the database of the delayed payment virtual card issuer 800). The incentive management system 106 can then analyze those transactions to apply any rewards earned on those transactions as previously described herein.

For enrolled users, the delayed payment virtual card issuer 800 can further process any received request for buy now pay later services, from the application running on the user device 118 or elsewhere, to approve or deny the request. The requests can occur serially. In other words, for each transaction for which the user wants to use buy now pay later services, a separate request is sent. The request includes information such as an identification of the product or service to be purchased, a merchant from whom the product or service is to be purchased, a date the purchase will take place, or like. Alternatively, the buy now pay later request is not for a specific product, service, or merchant but is rather for a specific amount and a specific shopping area. The shopping area can correspond to a geographic area of the type previously described with respect to a geographic area in which rewards can be spent. For example, a cardholder 110/user request for buy now pay later services can include a short-term loan amount (e.g., $100, $200, $600) or the like and can include a geographic area in which the amount will be limited to for making purchases. For example, the geographic area can be a specific shopping center or other geographic area of the type previously described herein with respect to limitations on the spending of earned rewards.

The delayed payment virtual card issuer 800 analyzes the request for buy now pay later services and makes a determined to approve or deny the request. As previously indicated, the delayed payment virtual card issuer 800 approves or denies the request based on factors such as prior repayment history (e.g., has the enrolled user timely repaid prior short-term loans, does the enrolled user currently have outstanding short-term loan payments, etc.), credit history for the enrolled user retrieved from third party credit rating agencies (e.g., one or more credit scores), the amount of the request, the location of the request, etc.

If the delayed payment virtual card issuer 800 denies the request, a corresponding message is transmitted using the communication device 132 of the delayed payment virtual card issuer 800 to the customer device 118 which receives the message using a corresponding communications device 132. The application on the customer device 118 processes the message to cause a message denying the request to be displayed.

If the delayed payment virtual card issuer 800 approves the request, the delayed payment virtual card issuer 800 issues a virtual payment card (i.e., referred to as the second virtual payment card herein to differentiate the virtual payment card issues by the virtual card issuer 108). The second virtual payment card is provided with a balance or spend limitation corresponding to the amount of the request. The delayed payment virtual card issuer 800 ties the second virtual payment card to the account of the enrolled cardholder/user who requested the service. For example, the delayed payment virtual card issuer 800 creates a database entry in memory of the delayed payment virtual card issuer 800 recording the issued second virtual payment card information and associating that information with the existing database entries for the enrolled payment cardholder/user (e.g., user identification information). The information of the second virtual payment card associated with the enrolled user can include information such as the virtual payment card number, security code, expiration date, approved spend limit, account balance, or the like. The database entry can further include payment card information (e.g., payment card number, security code, expiration date, etc.) for an enrolled cardholder/user's payment card for repayment of the short-term loan. This allows the delayed payment virtual card issuer 800 to be repaid for the short-term loan, for example, in automated periodic payments from the enrolled cardholder/user's payment card for repayment of the short-term loan.

Upon issuing the second virtual payment card, the delayed payment virtual card issuer 800 causes the second virtual payment card to be added to a virtual wallet on the user device 118. For example, upon issuing the second virtual payment card and storing payment information (e.g., virtual payment card number, security code, expiration date, etc.) in a database in memory of the delayed payment virtual card issuer 800 and corresponding to identification and/or other information associated with the cardholder/user, then the delayed payment virtual card issuer 800 transmits a message to the user device 118 to cause the second virtual payment card to be added to a virtual wallet thereon. The message (e.g., being communicated using the communications devices 132) can include payment card information (e.g., second virtual payment card number, security code, expiration date, etc.) and instructions formatted to cause the application running on the customer device 118 to, when executed, add the second virtual payment card to a virtual wallet on the customer device 118. The application can also use the message to display the balance or available spending limit for the second virtual payment card in a user interface of the application.

When making a purchase using the buy now pay later services provided by the delayed payment virtual card issuer 800, the user presents the second virtual payment card to a merchant point of sale system. For example, the cardholder 110/user selects the second virtual payment card using the virtual wallet on the user device 118 using a user interface system of the user device 118 (and/or the application running on the user device 118 associated) to make a purchase. The cardholder/user then presents the user device 118 to the merchant point of sale device 120 which communicate wirelessly, e.g., using near field communication, wireless communication, a quick reference code, or other wireless communication technique and communications devices 132. The user device 118 communicates the payment card information (e.g., payment card information, security code, expiration date, etc.) corresponding to the second virtual payment card to the merchant point of sale device. The merchant point of sale device generates a transaction authorization request for the transaction which is communicated through the payment network 102 to the delayed payment card issuer 800 (e.g., and through intermediaries as previously explained with respect to FIGS. 1 and 8). If the transaction authorization request is approved by the delayed payment virtual card issuer 800, the transaction approval is communicated back through the payment network 102 to the merchant and the transaction is completed, e.g., with settlement occurring simultaneously or at a later time through the payment network 102 and merchant bank 112, 124 and the delayed payment virtual card issuer 800. The delayed payment virtual card issuer 800 applies the transaction amount from the authorization request to the account of the cardholder/user and increases the balance on the second virtual payment card. The delayed payment virtual card issuer 800 can send a message to the user device 800 with instructions causing the application running thereon (associated with the incentive management system 106) to update the balance of the second virtual payment card or reduce the spending limit to account for the authorized transaction. If the transaction authorization request form the merchant point of sale device is rejected or refused by the delayed payment virtual card issuer 800, the transaction is refused and is not completed. No amounts change hands.

Authorization of a transaction request received from the merchant point of sale device 120 is handled by the delayed payment card issuer 800. The transaction authorization request from the point of sale device 120 includes transaction information such as the second virtual payment card number, second virtual payment card security code, second virtual payment card expiration date, merchant identification number, transaction amount, transaction date, merchant name, merchant location, and/or the like. The delayed payment virtual card issuer 800 uses this transaction information to make a determination to authorize/approve or not authorize/deny the transaction. The delayed payment virtual card issuer 800 uses the second virtual payment card number included in the transaction authorization request to identify the enrolled user in the database of enrolled users stored in memory. The delayed payment virtual card issuer 800 can then retrieve information from the database pertaining to the initial request for the buy now pay later service such as the product or service to be purchased, the merchant from whom the purchase is to be made, the day on which the purchase is to be made, the geographic area in which the purchase is to be made, etc. The delayed payment virtual card issuer 800 compares the authorization request to the retrieved data for the approved initial request and authorizes the transaction if the authorization request data and the retrieved approved initial request data match or if the authorization request data otherwise falls within the initial request data (e.g., that the transaction amount of the authorization request is equal to or lesser than the loan amount of the initial request that was approved). For example, the delayed payment virtual card issuer can compare a merchant identification in the authorization request to the merchant identification corresponding to the initial request for the short-term loan (or a merchant identification determined by data look up from a name of a merchant included in the initial request for the short-term loan). If the merchant identifications match, the authorization request is approved, i.e., the transaction is authorized.

A combination of these comparisons between the authorization request information and the approved initial request information can be used to determine whether to authorize or decline a transaction authorization request. For example, the transaction amount (being below the initial request amount), the merchant identification, and the date of the transaction can be used in combination to approve or deny a transaction. Other combinations of data can be used to determine if the transaction authorization request falls within the parameters of an approved initial short-term loan request such that the transaction authorization request should be approved.

In one embodiment, the initial request for the short-term loan is for a dollar amount (rather than a specific product) and for a particular geographic area (rather than a particular merchant). For example, the short-term loan initial request sent by the user from the user device 118 to the delayed payment virtual card issuer 800 is for a short-term loan of a specific dollar amount for spending at a specific shopping center on a specific day. Based on the initial request, once it is approved, and the shopping center identified in the request, the delayed payment virtual card issuer 800 can establish a geofence encompassing the identified shopping center. The delayed payment virtual card issuer 800 can then compare merchant location information included in transaction authorization requests with the geofence and approve authorization requests only when the merchant location of the authorization request falls within the geofence established based on the approved initial request for a short-term loan. In such embodiments where the initial request is for a dollar amount to be spend within a time frame (e.g., 1 day, 2 days, a week, etc.) at a particular shopping center or other geographic area, the delayed payment virtual card issuer 800 allows multiple transactions to be authorized so long as the sum of transaction amount for each transaction remains equal to or less than the approved initial request amount. In such cases, the delayed payment virtual card issuer 800 maintains a balance and reduced the balance of the user account upon each approved transaction and only approves transaction for which sufficient balance remains. In other words, if a transaction authorization request includes a transaction amount that would more than deplete the user's account (or exceed a predetermined limit on the second virtual card established based on the approved initial request for the short-term loan) then the delayed virtual payment card issuer 800 will deny the authorization request. The transaction will not be permitted to proceed. If sufficient balance or spend limit remains, the transaction will be authorized.

In alternative embodiments, rather than using a geofence of the type described herein for transaction authorization, the delayed payment virtual card issuer 800 can use alternative techniques to determine if the merchant identified in the transaction authorization request is within the geographic area corresponding to the approved initial request for a short-term loan. The technique used can be any of the techniques described herein previously with respect to the incentive management system 106 and determining if a rewards spending transaction authorization request is for a transaction taking place within the prescribed geographic area (e.g., the geographic area of a particular chopping center). For example, the delayed payment virtual card issuer 800 can maintain database entries for approved initial requests for short-term loans that include all merchants for which the initial request is approved. In other words, all the merchants within the chopping center can be listed by merchant identification number such that transactions are approved when the transaction authorization request includes a merchant identification matching the database of merchant identifications for merchants within the shopping center. This database of merchants can correspond to the database of enrolled merchants maintained by the incentive managements system 106 previously describe herein with respect to earning and/or spending rewards.

In some alternative embodiments, the incentive management system 106 handles transaction authorization requests in place of the delayed payment virtual card issuer 800. In such cases, the delayed payment virtual card issuer 800 receives transaction authorization requests (because the delayed payment virtual card issuer 800 acts as the cardholder's bank and is the issuer of the second virtual payment card for purposes of settlement transaction) but instead of acting on the authorization request, forwards the authorization request to the incentive management system 106 to determine whether the transaction authorization request should be approved or denied. The incentive management system 106 then makes this determination using the same factors and analysis previously described with respect to the delayed payment virtual card issuer 800. Any information needed for the determination can be provided to the incentive management system 106 by the delayed payment virtual card issuer along with the transaction authorization request (e.g., in a message communicated using communication devices 132 and including the authorization request and database information corresponding to the previously approved initial request for a short-term loan and any balance/spending limit information). This communication can take place by API. The incentive management system 106 then transmits to the delayed payment virtual card issuer 800 an instruction to approve or deny the transaction request (e.g., by internet connection, API, and communications devices 132 and using an appropriately formatted message) which then transmits the approval or denial to the merchant point of sale device 120 using the payment network 102.

Once a transaction authorization request is approved, settlement of the transaction occurs (as previously discussed). Settlement with the merchant 120 occurs by the delayed payment virtual card issuer 800 and the payment network 102. The delayed payment virtual card issuer 800 causes funds in the amount of the transaction amount of the approved transaction authorization request to be transferred through the payment network 102 to the merchant bank 112 used by the merchant 120 and thus the transaction is settled. In some embodiments, the delayed payment virtual card issuer 800 relies on a further third party for actual issuing of the second virtual payment cards and for funds/transaction settlement. In such cases, the delayed payment virtual card issuer 800 instructs this third party appropriately to carry out the functions described herein (e.g., by using communication devices 130, messages, instructions, and the transmission of relevant data). In some embodiments, this third party issuer/settler is the same virtual card issuer 108 used by the incentive management system 106 to issue first virtual payment cards for the purposes of spending earned rewards.

In some alternative embodiments, the incentive management system 106 provides for settlement with merchant banks (e.g., merchant bank 1, 112) in place of the delayed payment card issuer 800. The transfer of funds to the merchant bank 112 occurs using the incentive management system 106 which sends funds using the payment network 102.

Separately from settlement, at the end of the time period specified in in the approved initial request for a short-term loan, the delayed payment virtual card issuer 800 closes the second virtual payment card issued to the enrolled cardholder 110/user. Alternatively, any remaining balance or spend limit is reclaimed by the delayed payment virtual card issuer 800. This, along with the transaction authorization processes previously described, prevents the enrolled cardholder 100/user from making additional purchases using the second virtual payment card. In embodiments where the second virtual payment card is closed, the account of the enrolled cardholder 110/user is maintained. Upon receiving and approving an additional initial request for a short-term loan from the enrolled cardholder 110/user, the delayed payment virtual card issuer 800 issues a new second virtual payment card (e.g., having a different payment card number, security code, expiration date, and/or the like). The new second virtual payment card is added to the virtual wallet of the enrolled cardholder 110/user. This process of closing and issuing new second virtual payment cards occurs serially for each approved initial request for a short-term loan. In some cases, the virtual nature of the second virtual payment card allows for the payment card information to be reused for the same enrolled cardholder 110/user. If the same payment card information is not reused, when the new second virtual payment card is issued, the delayed payment virtual card issuer 800 updates the information in the database corresponding to the user and the new second virtual payment card. In embodiments where the second virtual payment card remains open but the balance is reclaimed and/or the spending limit is reset to zero, the second virtual payment card remains issued to the particular enrolled cardholder 110/user. When a new initial request for a short-term loan is approved, the delayed payment virtual card issuer 800 then increases the spend limit on the existing issued second virtual payment card or increases the balance on the issued second virtual payment card. After the time period in which the new short-term loan can be used, the balance is reclaimed or the spending limit is reset to zero. This process repeats for each new initial request for a short-term loan (assuming the request is approved, the approval process as detailed above taking place for each new request).

Referring now to FIG. 10A, a simplified block diagram, according to one embodiment, shows the relationship between the incentive management system 106 and the delayed virtual payment card issuer 800 and the creation of a second virtual payment card for delayed payments where the virtual payment card is created by the delayed virtual payment card issuer 800. In a first step, a cardholder 110/user sends a request for a loan using their customer device 118 (e.g., using the incentive management application running of the customer device 118). The incentive management system 106 receives the request using an API. In a second step, the cardholder 110/user connects a physical bank card (e.g., payment card or other banking information such as account number and routing number for a checking account) to the loan request. This bank card will be used for repayment of the loan. The bank card can be connected by providing the bank card information (e.g., card number, security code, etc.) to the incentive management system 106 using an API and through the customer device 118. In a third step, the incentive management system 106 makes a proxy user request for a loan to the delayed virtual payment card issuer 800. The proxy user request is sent on behalf the cardholder 110/user by the incentive management system 106 to the delayed virtual payment card issuer 800 with both systems communicated using appropriate APIs. The proxy user request for a loan includes loan request information (e.g., loan amount, merchant, shopping area, name, address, date for spend, and/or other loan request information) and includes information of the user's bank card for repaying the loan (e.g., payment card number, security code, etc.) that the incentive management system 106 previously received from the cardholder 110/user. The proxy loan request can also include customer device 118 information (e.g., device MAC address, incentive application information, user account number or other identification information, or the like) such that any approved loan request can result in the second virtual payment card being provided in the virtual wallet of the user device 118. The cardholder 110/user does not communicate directly with the delayed virtual payment card issuer. In a fourth step, the delayed virtual payment card issuer 800 issues the second virtual payment card for the cardholder 110/user to spend any approved short-term loan amount/request. The delayed payment virtual payment card issuer 800 issues the second virtual payment card and communicates the payment card information of the second virtual payment card (e.g., payment card number, security code, expiration date, etc.) to the user device 118 that allows the second virtual payment card to be added to the virtual wallet of the user device 118. This information can be communicated using an appropriate API. In alternative embodiments, the payment card information of the second virtual payment card is communicated to the incentive management system 106 which then communicates the information to the user device 118 such that the second virtual payment card is added to the virtual wallet of the user device 118. In such embodiments, the delayed virtual payment card issuer 800 does not communicate directly with the user device 118. In a fifth step, the delayed virtual payment card issuer 800 sends payment card information for the second virtual payment card to the incentive management system 106. This allows the incentive management system 106 to associate payment card information of the second virtual payment card (e.g., payment card number, security code, etc.) with enrolled cardholders 110/users. This in turn allows for the incentive management system 106 to track spending by the second virtual payment card and to provide rewards for such spending that meet the requirements for earning rewards previously discussed herein. In a sixth step, the delayed virtual payment card issuer 800 automatically deducts a portion of the amount of the short-term loan on a periodical basis until the short-term loan amount has been repaid.

Referring now to FIG. 10B, a simplified block diagram, according to one embodiment, shows the relationship between the incentive management system 106 and the delayed virtual payment card issuer 800 and the creation of a second virtual payment card for delayed payments where the virtual payment card is created by the incentive management system 106. The incentive management system 106 and the delayed virtual payment card issuer 800 operate in the same or a similar manner as discussed with reference to FIG. 10A except where otherwise specifically detailed. In a first step, the cardholder 110/user sends a request for a loan to the incentive management system 106 using customer device 118 (e.g., using the incentive management application and an API). In a second step, the cardholder 110/user connects a physical bank card to the loan request (if not already done so, e.g., by an existing account) for repayment of the short-term loan. The incentive management system 106 submits a proxy request for a loan on behalf of the user and to the delayed payment virtual card issuer 800. The delayed virtual payment card issuer 800 determines whether or not to approve the loan request. Upon approval and in a fourth step, the delayed virtual payment card 800 sends approval for the loan request to the incentive management system 106 (if the loan request is denied, a denial is transmitted). The incentive management system 106 can then communicate the approval or denial to the user via the customer device 118. Upon receiving a loan approval from the virtual payment card issuer 800 and in a fifth step, the incentive management system 106 creates the second virtual payment card (i.e., issues or causes to be issued through a third-party issuer the second virtual payment card). The incentive management system 106 causes the second virtual payment card to be added to the virtual wallet of the user device 118 in the manner previously explained. In a sixth step, the incentive management system 106 sends payment card information corresponding to the second virtual payment card to the delayed virtual payment card issuer 800 (e.g., payment card number, security code, expiration date, etc.). The information can also include identifying information corresponding to the user (e.g., user account number, name, address, etc.). The delayed payment virtual card issuer 800 funds the second virtual payment card and uses the received virtual payment card data to associate the second virtual payment card with an approved loan request. This also allows the delayed virtual payment card issuer 800 to, in the seventh step, send money to the second virtual payment card balance (e.g., increase the spending limit or add money to the balance of the second virtual payment card). The delayed virtual payment card issuer 800 or the incentive management system 106 handle transaction authorization requests for purchases using the second virtual payment card as previously described herein. In an eight step, the delayed virtual payment card 800 periodically automatically deducts periodic payments from the user's physical bank card. In this embodiment, the incentive management system 106 issues and creates the second virtual payment card, but the delayed virtual payment card issuer 800 funds the second virtual payment card.

In some embodiments, the incentive management system uses the delayed virtual payment card issuer to issue a discrete and separate virtual payment card for each approved short term loan. In such embodiments, the incentive management system sends instructions to the delayed virtual payment card issuer to issue a virtual payment card with a predetermined credit limit (e.g., the discrete virtual payment card is a credit instrument). In such cases spending relative to the credit limit is controlled as the spending relative to the geographic area. The delayed virtual payment card issuer receives transaction authorization requests from the merchant banks through the payment network and forwards those requests to the incentive management system which approves (e.g., the transaction is within the geographic area, with an enrolled merchant, and the transaction amount will not cause the credit limit to be exceeded) or denies the transaction using the systems and techniques described herein (e.g., querying one or more databases and/or systems using the transaction information in the authorization request). The second virtual payment card for the short term loan is also given a period of activation after which time the second virtual payment card cannot be used for purchases. This period can be 7 days (or any other suitable period, e.g., 2 days, a single day, a month, or the like). When the second virtual payment card is presented during the activation period and all other conditions are met (e.g., geographic area, enrolled merchant, credit limit, etc.), then the incentive management system will authorize transactions. At the end of the activation period, the incentive management system will automatically decline all transaction authorization requests for additional spend. The incentive management system also then creates a single loan for repayment equal to the amount spend during the activation period using the second virtual payment card. This loan is then separately repaid by the user (e.g., in four monthly, interest free, payments). Advantageously, this allows a user to have buy now pay later services without separate loans with different terms and periods for several purchases made on a single shopping trip. Multiple purchases are aggregated into a single loan to simplify repayment. In some embodiments, the loan is not created until after the expiration of a returns period. This allows for the user to make returns in a simplified manner. During the period of activation and the returns period, a user may simply return a product and have the merchant credit the payment card used for the purchase in the traditional manner. Advantageously, such returns are credited against the second virtual payment card. By delaying the creation of the loan until after the returns period, returns can be credited to the virtual payment card first so that the user is not paying a loan on a funds for a product that has ben returned and with the return value being credited to a different payment card or being returned in store credit or another mechanism. The second virtual payment card and associated account are kept active (e.g., not expired) during the returns period to provide for the acceptance of returns. The incentive management system will accept and approve transactions crediting the second virtual payment card in the event of a return (e.g., by receiving a request from the merchant bank, through the payment network, and through the delayed virtual payment card issuer, and then sending an instruction to the delayed virtual payment card issuer to cause the authorization request to be approved) during the returns period. At the end of the returns period, the incentive management system will cause all transaction authorization requests to be denied and/or the second virtual payment card expired (in alternative embodiments, the second virtual payment card is kept open for further short term loans). In some embodiments, the returns period is 30 days. In alternative embodiments, the returns period can be any suitable period of time (e.g., 7 days, 60 days, 90 days, or the like). The returns period can correspond to the time in which a merchant allows for returns that are credited against the payment method used to make the purchase.

An example of the period of activation and the returns period follows. A user applies for a short term loan through the incentive management system and is approved. The incentive management system sends an instruction to the delayed virtual payment card issuer which causes the delayed virtual payment card issuer to issue a second virtual payment card which is then provided to the user's app or app wallet through the incentive management system (e.g., providing the second virtual payment card information to the user's app by communicating with the user device). The activation period is set to 7 days and credit limit is set by the incentive management system and/or the delayed virtual payment card issuer, in this example $1,000. The user presents the second virtual payment card for a transaction outside the geographic area at a merchant point of sale system which transmits an authorization request to the delayed virtual payment card issuer through the payment network. The delayed virtual payment card issuer forwards the transaction authorization request to the incentive management system which determines the transaction is occurring outside the geographic area and sends an instruction to the delayed virtual payment card issuer to decline the authorization request and send such an instruction to the merchant point of sale through the payment network. Authorization requests for transactions with non-enrolled merchants and for amounts that would cause the credit limit to be exceeded are similarly declined. The user presents the second payment card for a purchase at two different enrolled merchants within the geographic area for purchases of $30, $100 and $150 on days 1, 2, and 5 of the activation period respectively. Both transaction authorization requests are approved and the transactions proceed. The activation period expires at the end of the 7th day. On the day following the activation period (day 8) the user attempts to make a purchase using the second virtual payment card. The transaction authorization request is routed to the inventive management system which determines the transaction is occurring outside the activation period and sends an instruction to the delayed virtual payment card issuer to cause the transaction authorization request to be declined. The incentive management system can interact with the app on the user device to inform the user that the second virtual payment card is no longer active for purchases. The returns period begins running on day 8. On day 30, the user returns the second purchase ($150) and presents the second virtual payment card to complete the return. The merchant sends a transaction authorization request to credit $150 to the second virtual payment card account. The transaction authorization is communicated to the incentive management system through the payment network and the delayed virtual payment card issuer. The incentive management system determines that the request is a credit and that the returns period is active and sends an instruction to the delayed virtual payment card issuer to cause the transaction authorization request to be approved. The returns period expires and starting on day 38 the incentive management system aggregates all purchases by creating single a loan for the current balance of the second virtual payment card, $130 with the return having already reduced the balance of the account associated with the second virtual payment card. The user is informed of the $130 loan and is given 4 months to repay the amount, the first payment being due one month from day 38. On day 50, the user attempts to return the $30 purchase. Should the merchant attempt to the credit the second virtual payment card through an authorization request, it is declined as the incentive management system determines that the returns period is expired. On day 60, the user attempts to make a purchase with the second virtual payment card at an enrolled merchant within the geographic area for $50. The transaction otherwise would be approved but in this case the timing is outside the period of activation. The second virtual payment card is expired and the transaction authorization request is denied (in alternative embodiments the second virtual payment card may not be expired but the transaction authorization request is still denied). The user repays the loan. It should be understood that this is simply an example and variations are possible as explained herein. In some embodiments, a user may have multiple overlapping loans and second virtual payment cards, the dates, amounts, etc. for which are each tracked individually.

Referring now to FIG. 11, for settled transactions, the incentive management system 106 determines if such transactions using buy now pay later services from the delayed payment virtual card issuer 800 qualify to earn rewards. This occurs using the parameters previously described with respect to enrolled cardholders 110 who enroll with the incentive management system 106 for earning rewards. In one embodiment, the delayed virtual payment card issuer 800 provides the incentive management system 106 with payment card information corresponding to the second virtual payment card for short term loans and issued to an enrolled payment cardholder 110. The incentive management system 106 associates the payment card information of the second virtual payment card with the enrolled cardholder 110 such that spending with the second virtual payment card that is eligible to otherwise earn rewards earns rewards which are associated with the enrolled cardholder 110. For example, the incentive management system 106 provides the payment card information corresponding to the second virtual payment card to the transaction data aggregator 104 in order to collect transaction information corresponding to transactions carried out using the second virtual payment card. The incentive management system 106 receives transaction data from the transaction data aggregator 104 for the second virtual payment card and analyzes the received transaction data to identify transaction that qualify for rewards using the techniques previously described herein. In an alternative embodiments, the delayed payment card issuer 800 provides the transaction data directly to the incentive management system 106 and the incentive management system 106 then analyzes all transactions involving the second virtual payment card using the techniques previously described herein in order to determine which, if any, of the transactions qualify to earn rewards. Earned rewards on transactions involving the second virtual payment card are then applied to the virtual payment card previously issued for spending earned rewards.

The spending of earned rewards, whether earned by the enrolled payment card or by the second virtual payment card for short term loans, is controlled by the incentive management system 106 and transaction authorization as previously explained herein. This is shown in FIG. 11, wherein a transaction authorization request involving the virtual payment card (for spending earned rewards) is transmitted to the incentive management system 106 from the merchant point of sale where the virtual payment card is presented for payment on a transaction. The authorization request is transmitted through the payment network 102. The authorization request can also be transmitted from the payment network to the virtual card issuer and then to the incentive management system for authorization or refusal. The incentive management system transmits the approval or the denial back through the virtual card issuer to the payment network and to the merchant point of sale. Settlement occurs through the payment network.

Authorization for transactions involving the second virtual payment card, for purchases using short-term loan funds, occurs in a similar fashion and as previously described. The enrolled cardholder 110/user who has been issued the second virtual payment card for making purchases with a short-term loan presents the second virtual card at a merchant in order to make a purchase with the short-term loan funds. For example, the enrolled cardholder 110/user presents the second virtual payment card using the virtual wallet on the user device to a merchant point of sale. The merchant point of sale device submits an authorization request for the transaction using payment card information received from the user device and pertaining to the second virtual payment card. The authorization request is communicated through the payment network and is received by the incentive management system and/or the delayed virtual payment card issuer (e.g., the incentive management system can forward the request to the delayed virtual payment card issuer or the delayed virtual payment card issuer can forward the request to the incentive management system). The incentive management system and/or the delayed virtual payment card issuer either authorize or deny the transaction as previously explained. The response, authorization or denial, is then communicated back through the payment network. If the transaction is authorized, the transaction is settled through the payment network.

Referring now generally to FIGS. 8-11, the techniques for providing buy now pay later services and earned rewards for purchases made using those services have been describe in reference to the system 100 using two virtual payment cards—a first virtual payment card for providing earned rewards and a second virtual payment card for making buy now pay later purchases. However, in alternative embodiments a single virtual payment card is used to provide both earned rewards/rewards spending and also provide buy now pay later services. In such an embodiment, earned rewards and loan amounts are provided on the same virtual payment card. The singular virtual payment card, through the incentive management system, distinguishes between rewards dollars and buy now pay later funds such that the amounts are tracked and selectively spendable by enrolled users.

Funds are added the to the virtual payment card as the result of earned rewards and/or approved buy now pay later short term loans as previously described herein. The incentive management system maintains a database of debits and credits to the virtual payment card account in order to distinguish between earned rewards and short term loan amounts. For example, when the incentive management system determines that a transaction has earned rewards, as previously described herein, the incentive management system adds the earned rewards balance to the virtual payment account and records the addition in a ledger identifying the added funds as earned rewards. Similarly, when the incentive management system identifies an authorized buy now pay later short term loan, as previously described herein, the amount is added to the virtual payment card account and in a ledger which identifies the added funds as loan funds.

In alternative embodiments, the incentive management system maintains two separate accounts both of which are tied to and spendable by the single virtual payment card. The balance of the separate accounts is maintained separately with one account corresponding to earned rewards and other corresponding to buy now pay later short term loan funds.

Funds are spent using the single virtual payment card as previously explained herein. The enrolled user can select whether to spend earned rewards or spend short term loan funds from an authorized buy now pay later request. For example, the application running on the user device can prompt the user to select whether to spend rewards or loan funds. For example, the application can include GUI elements that allow for the selection. After selection, the virtual wallet is opened, allowed to make purchases, or the virtual payment card information is otherwise made accessible to present to the merchant point of sale device. Before, after, or simultaneously with the purchase using the virtual payment card, the application causes the customers device to transmit a message to the incentive management including an indication that the virtual payment card has been presented to make a purchase, a time stamp, and a user identification (e.g., the virtual payment card number or account number). The message can further include additional information such as a location information (e.g., provided by GPS data from the user device). The incentive management system can use the message information from the application and user device to correlate the information with transaction data. For example, the incentive management system uses the time stamp and identification information (e.g., virtual payment card number) received in the message to correlate the remaining message information with transaction data otherwise received as explained herein (e.g., during transaction approval and settlement). The message time stamp and account number are matched to transaction data having the same account number and same timestamp. The timestamps can be considered a match if within a certain window (e.g., the two time stamps are substantially the same such as being within 30 seconds of each other, within 1 minute of each other, 5 minutes of each other, or other suitable time window). The time window accounts for the time differences in the presentation of the virtual payment card and assignment of a timestamp to the transaction by the merchant point of sale device.

Once a transaction has been correlated with the message information, the incentive management system can assign the transaction a status as rewards spend or short term loan spend based on the indication included in the message from the application and the user device. The incentive management system then updates the ledger for the virtual payment card rewards and loan funds by debiting the appropriate amount from the appropriate ledger based on the status indicator for the transaction being a rewards transaction or a short term loan transaction. The incentive management system can then communicate with the user device and the application to provide ledger updates which the application then presents to the user through a graphical user interface to inform the user of the balance of rewards and loan amounts.

In the embodiment where separate accounts are used to track rewards and loan amounts, when a user presents the virtual payment card for a transaction, the user selects through the application which account from which funds are to be spent. The account information can be included in the transaction data and used by the incentive management system to update each individual account. The account information can instead by transmitted in a manner as previously described with respect to the message including an indication that the virtual payment card has been presented to make a purchase, a time stamp, and a user identification.

It should be understood that for either or both the rewards earning and spending and/or the short term loan spend approval functionalities, the system need not be limited to a single geographic location but can instead use, permit, or integrate a plurality of geographic locations. Such use of a plurality of locations can be used to, for example, create a rewards ecosystem of merchants and users that limits rewards spend not to a particular mall, as has been described in examples here, but rather to particular merchants participating in the ecosystem. In some such embodiments, rewards spend authorization and/or short term loan spend authorization (or other functions of the type described herein) can be limited by individual geographic location corresponding to all merchant locations or can be controlled using other techniques as previously described herein (e.g., using merchant ID or other transaction information). In some embodiments, the geographic location is simply more expansive. For example, a rewards ecosystem can permit the earning or rewards online or at any participating merchant store (or only those in the geographic location depending on the embodiment) and limit the spending of earned rewards to enrolled merchants but any enrolled merchant location within, for example, a city, county, state, or the like. Taking for example, embodiments in which the geographic limitation is that of a city, a user can only redeem rewards at enrolled merchants with a physical location within the city. Transactions for the redemption of rewards including transaction information indicating a transaction is occurring outside the city will be declined by the incentive management server (this process can be altered as previously described herein depending on the technique for authorizing transactions and controlling the same). Advantageously, this larger geographic region allows for a rewards ecosystem built around local/regional interests for example sports teams (National Football League, Major League Baseball, college athletics, and the like) being located in or having a fan base in the city or other larger geographic location (as opposed to a mall as previously described in the examples herein).

Generally, the functions, systems, processes, and the like described herein are implemented using software and database structures and operations of the type generally known in the art running on computing equipment of the type generally known in the art. Databases of the type described herein can, for example, refer to either a body of data, a relational database management system (RDBMS), or to both. A database can, for example, include any collection of data including hierarchical databases, relational databases, flat file databases, object-relational databases, object oriented databases, and any other structured collection of records or data that is stored in a computer system. Examples of RDBMS's include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

With respect to the databases described herein, several database related operations are described such as querying databases, comparing entries between databases, adding entries to databases for established values, adding information to an existing database of a type not already recorded in the database, creating new databases, reading from databases, and the like. To carry out these functions any suitable database operators, instructions, requests, functions, programs, code, or the like known to one skilled in the art can be used. For example, databases can be operated using structured query language (SQL) and operations can be carried out using clauses (e.g., constituent components of statements and queries), expressions (e.g., commands to produce either scalar values, or tables consisting of columns and rows of data), predicates (e.g., that specify conditions that can be evaluated to SQL three-valued logic true/false/unknown or Boolean truth values and are used to limit the effects of statements and queries, or to change program flow), queries (e.g., that retrieve that data based on specific criteria), statements (e.g., that have a persistent effect on schemata and data, or can control transactions, program flow, connections, sessions, or diagnostics), or the like. In should be understood that regardless of the particular implementation of a database and the corresponding programming language, data can be written to, read from, manipulated, compared, or otherwise processed using known data processing techniques and associated known programming techniques.

As described herein, components of the system and/or other components communicate with one another through instructions, requests, or the like. It should be understood that instructions, requests, or the like as described herein are digital messages, communications, program instructions, or the like that communicate information using, for example, a digital message having a compatible format. The message can be formatted according to an application programming interface (API), standard, or the like. The instructions, requests, or the like are formatted such that they are processed by the receiving entity. Such communication can be carried out using communications devices of each respective component. Communications devices of the type described herein include physical components (e.g., antenna's, processor, circuitry, etc.) and software or other instructions (e.g., firmware, instructions, communication standards, etc.). The communication device can be or include a WiFi module, cellular communication module, modem, Bluetooth module, NFC (near field communication) module, XBee module, and/or the like. The communication device can use any suitable corresponding communications standard such as an 802.11 standard, 4G or 5G cellular communications standard, Bluetooth 4.0 or 5.0, ECMA-340 NFC standard, XBee standard, TCP/IP, and/or the like.

The communication device can include components for cellular communication of voice, data, short message service, and/or Internet communication. Cellular communication can be achieved using system on a chip devices such as a processor adapted for cellular communication and coupled antennas. For example, cellular communication can be achieved using Qualcomm® or Apple® chips and antennas adapted for 4G, 4G LTE, 5G or other similar suitable communication standards. Communication can also be achieved using components for other suitable wireless communication such as processors and antennas for implementing a WiFi communication protocol and standard (e.g., 802.11a, 802.11n, or like standard), a Bluetooth communication protocol and standard (e.g., Bluetooth 5.0, or like standard). These standards can be used to communicate with an additional device allowing for pass through internet communications. In other words, the user device 102 can communicate with a further device using Bluetooth and the further device provides a bi-directional internet connection using additional communication equipment (e.g., a cellular communication device).

Processor of the type described herein can, for example, include any programmable system including systems using micro-controllers, reduced instruction set circuits (RISC), application specific integrated circuits (ASICs), logic circuits, and any other circuit or processor capable of executing the functions described herein.

The functions and systems described herein are implemented using, in part, software, firmware, programs, functions, or the like as described herein. These data processing systems and techniques can, for example, include any computer program stored in memory for execution by a processor, including RAM memory, ROM memory, EPROM memory, EEPROM memory, and non-volatile RAM (NV RAM) memory.

In some embodiments, a computer program is provided which performs some or all of the functions described herein with respect to individual components of the system, and the program can be embodied on a computer readable medium. In some embodiments, portions of the system and portions of the associated functions are executed on a single computer system, without requiring a connection to a sever computer. In some embodiments, all or portions of the systems and/or components described herein are being run in a Windows® environment (Windows is a registered trademark of Microsoft Corporation, Redmond, Wash.). In yet another embodiment, all or portions of the systems and/or components described herein are run on a mainframe environment and a UNIX® server environment (UNIX is a registered trademark of X/Open Company Limited located in Reading, Berkshire, United Kingdom). Applications of the type described herein should be understood to be flexible and designed to run in various different environments without compromising any major functionality. In some embodiments, the system includes multiple components distributed among a plurality of computing devices. One or more components can be in the form of computer-executable instructions embodied in a computer-readable medium. The systems and processes are not limited to the specific embodiments described herein. The descriptions provided herein illustrate at least one example of carrying out the described functions. In addition, components of each system and each process can be practiced independent and separate from other components and processes described herein. Each component and process can also be used in combination with other assembly packages and processes.

Changes can be made in the above constructions without departing from the scope of the disclosure. It is intended that all matter contained in the above description or shown in the accompanying drawings shall be interpreted as illustrative and not in a limiting sense.

I claim:

1. A method for incentivizing repeat transactions with merchants within a prescribed geographic area using payment process network data, the method comprising:
acquiring, in response to a data request, a first set of transaction data from a payment network at and using a transaction data aggregator, the payment network comprising a server adapted and configured to communicate with merchant banks and payment card issuing banks to settle transactions between payment cardholders and merchants;
creating, at and using an incentive management system, a database of a second set of transaction data, the second set of transaction data being a subset of the first set of transaction data, the database of the second set of transaction data created by at least (1) comparing the first set of transaction data to a database of enrolled payment cardholder identification data and selecting those transactions in the first set of transaction data that include identification information associated with enrolled payment cardholders and stored in the database of enrolled payment cardholder identification data or (2) comparing the first set of transaction data to a database of enrolled merchant identification data and selecting those transactions in the first set of transaction data that include identification information associated with enrolled merchants and stored in the database of enrolled merchant identification data, wherein the selected transactions are entered into the database of the second set of transaction data;
identifying, at and using the incentive management system, rewards eligible transactions and creating a database of rewards eligible transactions by at least (1) comparing the database of the second set of transaction data, when said database includes transactions selected as including identification information associated with enrolled payment cardholders, to a database of enrolled merchant identification data and selecting those transactions that include identification data matching identification data within the database of enrolled merchant identification data or (2) comparing the database of the second set of transaction data, when said database includes transactions selected as including identification information associated with enrolled merchants, to a database of enrolled payment cardholders and selecting those transactions that include identification data matching identification data within the database of enrolled payment cardholders identification data;
calculating rewards, at and using the incentive management system, by querying the database of rewards eligible transactions to determine, for each transaction, a dollar amount of the transaction, multiplying the dollar amount by a rewards factor to calculate a rewards amount for each rewards eligible transaction within the database of rewards eligible transactions;
transmitting, from the incentive management system and for each transaction within the database of rewards eligible transactions, an instruction to a virtual card issuer to apply the rewards amount to an account corresponding to the cardholder identification data associated with the eligible transaction within the database of rewards eligible transactions, the instruction including the rewards amount and a cardholder identification, the account being tied to a virtual payment card issued by the virtual card issuer;
receiving, at and using the incentive management system and from the virtual card issuer, a transaction authorization request associated with a transaction initiated by an enrolled payment cardholder to make a purchase using rewards, the transaction authorization request including transaction data including at least enrolled payment cardholder identification information and merchant identification information;
determining, at and using the incentive management system, if the transaction of the transaction authorization request occurred within a prescribed geographic area in which rewards may be spent at enrolled merchants via (1) transmitting, from the incentive management system, a request to a payment cardholder device for position data using global positioning system data, the request adapted and configured to cause an incentive application running on the payment cardholder device to retrieve position data and transmit the position data to the incentive management system, (2) receiving, from the payment cardholder device and at the incentive management system, position data and associating that position data with the transaction authorization request, (3) comparing the position data associated with the transaction authorization request to a geofence boundary defining the prescribed geographic area in which rewards may be spent at enrolled merchants, and (4) determining that the transaction of the transaction authorization request is occurring within the prescribed geographic area when the position data associated with the transaction authorization request corresponds to a location within the geofence boundary, wherein the prescribed geographic area corresponds to at least one of: a shopping mall, an outlet mall, a community improvement district, a tax increment financing district, a commercial district, and a retailer;
in response to determining that the transaction is occurring within the prescribed geographic area in which rewards may be spent, transmitting from the incentive management system and to the virtual card issuer, an authorization for the virtual card issuer to complete the transaction using the rewards;
issuing, using one or more of the incentive management system or a delayed payment virtual card issuer, a second virtual payment card to the enrolled payment cardholder, the second virtual payment card capable of making purchases using short term loan funds provided by an issuer of the second virtual payment card for authorized transactions;
transmitting, from the incentive management system to the payment cardholder device running the incentive application, an instruction including account information associated with the second virtual payment card, the instruction being adapted and configured to enable the payment cardholder device to be presented at a merchant point of sale device to trigger a transaction authorization request for making a purchase with the short term loan funds being tied to the second virtual payment card;

receiving, at one or more of the incentive management system or the delayed payment virtual card issuer, a transaction authorization request from a merchant and for a transaction using the second virtual payment card, the transaction authorization request triggered at least in part through presentation of the payment cardholder device at the merchant point of sale device;

using one or more of the incentive management system or the delayed payment virtual card issuer, comparing the transaction authorization request from the merchant and for a transaction using the second virtual payment card and a prior approved loan request to determine if the transaction authorization request from the merchant and for a transaction using the second virtual payment card is for a transaction consistent with the prior approved loan request by verifying that the transaction authorization request is at least one of (i) for a transaction value that is less than or equal to an amount from the prior approved loan request and (ii) prior to expiration of a time period specified in the prior approved loan request; and using one or more of the incentive management system or the delayed payment virtual card issuer and in response to determining that the transaction authorization request from the merchant and for a transaction using the second virtual payment card is for a transaction consistent with the prior approved loan request, approving the transaction authorization request from the merchant and for a transaction using the second virtual payment card, wherein the transaction using the second virtual payment card is capable of being a rewards eligible transaction, and if the transaction using the second virtual payment card is a rewards eligible transaction calculating, using the incentive management system, a rewards amount for the transaction using the second virtual payment card and transmitting, from the incentive management system, an instruction to the virtual card issuer to apply the rewards amount to an account corresponding to the cardholder identification data associated with cardholder identification data associated with the second virtual payment card.

2. The method in accordance with claim 1, further comprising enrolling a merchant by adding an entry to the database of enrolled merchant identification data, the entry including at least identification information corresponding to the merchant being enrolled, the at least identification information corresponding to the merchant being enrolled having been received from a merchant device.

3. The method in accordance with claim 2, wherein enrolling a merchant further comprises receiving a request for enrollment from a merchant, evaluating the request using the incentive management system, and transmitting to the merchant device a request for merchant identification information.

4. The method in accordance with claim 1, further comprising enrolling a payment cardholder by adding an entry to the database of enrolled payment cardholder identification data, the entry including at least identification information corresponding to the payment cardholder being enrolled, the at least identification information corresponding to the payment cardholder being enrolled having been received from the payment cardholder device.

5. The method in accordance with claim 4, wherein enrolling a payment cardholder further comprises receiving a request for enrollment from a payment cardholder, evaluating the request using the incentive management system, and transmitting to the payment cardholder device a request for payment cardholder identification information.

6. The method in accordance with claim 1, wherein the identification information associated with enrolled merchants and stored in the database of enrolled merchant identification data includes one or more of a merchant ID (MID), a terminal ID (TIO), a merchant name, or a merchant address.

7. The method in accordance with claim 1, wherein the database of enrolled merchant identification data includes merchant identification data for a single merchant corresponding to both a physical location and an internet accessible purchase portal, such that the incentive management system is adapted and configured to generate rewards for transactions conducted with an enrolled merchant for both physical location sales and internet sales.

8. The method in accordance with claim 1, wherein the database of enrolled merchant identification data includes merchant identification data for a single merchant corresponding to both a physical location and an internet accessible purchase portal, such that the incentive management system is adapted and configured to generate rewards for transactions conducted with an enrolled merchant for both physical location sales and internet sales.

9. The method in accordance with claim 1, wherein the instruction to the virtual card issuer to apply the rewards amount further instructs the virtual card issuer to transmit a push update to the application running on the payment cardholder device, the push update adapted and configured to change a rewards balance displayed through the application running on the payment cardholder device to reflect additional rewards earned.

10. The method in accordance with claim 1, further comprising:
receiving, at the virtual card issuer the authorization for the virtual card issuer to complete the transaction using the rewards;
in response to receiving the authorization for the virtual card issuer to complete the transaction using the rewards, transmitting, from the virtual card issuer, a push update to the application running on the payment cardholder device, the push update adapted and configured to change a rewards balance displayed through the application running on the payment cardholder device to reflect the rewards spent.

11. The method in accordance with claim 10, further comprising:
receiving, at the virtual card issuer the authorization for the virtual card issuer to complete the transaction using the rewards;
in response to receiving the authorization for the virtual card issuer to complete the transaction using the rewards, transmitting, from the virtual card issuer and through the payment network, an authorization for the transaction to proceed.

12. The method in accordance with claim 1, further comprising:
transmitting, in response to enrolling a payment cardholder, a data request from the incentive management system to the transaction data aggregator seeking transaction data associated with the enrolled payment cardholder, the data request seeking historical transaction data; and receiving from the transaction data aggregator historical transaction data corresponding to transaction occurring before the payment cardholder was enrolled.

13. The method in accordance with claim 1, further comprising:

generating an enrolled payment cardholder master identification upon enrolling the enrolled payment cardholder;

associating, in the database of enrolled payment cardholder identification data, the enrolled payment cardholder master identification with a plurality of payment card identifications;

transmitting, from the incentive management system and to the virtual card issuer, an instruction to cause the virtual card issuer to create an account corresponding to the enrolled payment cardholder master identification such that the enrolled payment cardholder master identification associates a plurality of payment cards held by a single enrolled payment cardholder to the account corresponding to the single enrolled payment cardholder and such that rewards generated across the plurality of payment cards held by the single enrolled payment cardholder are applied to the one account corresponding to the single enrolled payment cardholder; and for each rewards eligible transaction in the database of rewards eligible transactions, applying an enrolled payment cardholder master identification based on the cardholder identification information associated with the enrolled payment cardholder master identification and based on the cardholder identification information associated with each transaction in the database of rewards eligible transactions.

14. The method in accordance with claim 13, wherein transmitting an instruction to a virtual card issuer to apply the rewards amount to an account corresponding to the cardholder identification data associated with the eligible transaction with the database of rewards eligible transactions comprises transmitting an enrolled payment cardholder master identification along with the rewards amount, the cardholder identification of the instruction being the enrolled payment cardholder master identification.

15. The method in accordance with claim 13, further comprising:

enrolling a payment cardholder by adding an entry to the database of enrolled payment cardholder identification data, the entry including at least identification information corresponding to the payment cardholder being enrolled and including information corresponding to at least two payment cards held by the payment cardholder;

transmitting an instruction, from the incentive management system and to the virtual card issuer, an instruction to create an account corresponding to the enrolled payment cardholder, the account having a unique identification;

receiving from the virtual card issuer the unique identification associated with the account;

generating an enrolled payment cardholder master identification that is equivalent to the unique identification associated with the account;

associating, in the database of enrolled payment cardholder identification data, the enrolled payment cardholder master identification with a plurality of payment card identifications; and for each rewards eligible transaction in the database of rewards eligible transactions, applying an enrolled payment cardholder master identification based on the cardholder identification information associated with the enrolled payment cardholder master identification and based on the cardholder identification information associated with each transaction in the database of rewards eligible transactions.

16. The method in accordance with claim 15, wherein transmitting an instruction to a virtual card issuer to apply the rewards amount to an account corresponding to the cardholder identification data associated with the eligible transaction with the database of rewards eligible transactions comprises transmitting an enrolled payment cardholder master identification along with the rewards amount, the cardholder identification of the instruction being the enrolled payment cardholder master identification.

\* \* \* \* \*